(12) United States Patent
Nara et al.

(10) Patent No.: US 7,188,046 B2
(45) Date of Patent: Mar. 6, 2007

(54) FORM MEASURING DEVICE, FORM MEASURING METHOD, FORM ANALYSIS DEVICE, FORM ANALYSIS PROGRAM, AND RECORDING MEDIUM STORING THE PROGRAM

(75) Inventors: Masayuki Nara, Tsukuba (JP); Makoto Abbe, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 28 days.

(21) Appl. No.: 10/936,509

(22) Filed: Sep. 9, 2004

(65) Prior Publication Data

US 2005/0065751 A1    Mar. 24, 2005

(30) Foreign Application Priority Data

Sep. 9, 2003   (JP)   ............................ 2003-316829
Sep. 9, 2003   (JP)   ............................ 2003-316852

(51) Int. Cl.
    *G01B 7/00*   (2006.01)
(52) U.S. Cl. ...................... 702/155; 356/514
(58) Field of Classification Search ................ 702/155;
    356/514, 154; 348/570; 345/83, 82, 88;
    313/493, 110; 362/27, 293
    See application file for complete search history.

(56) References Cited

U.S. PATENT DOCUMENTS

| | | | |
|---|---|---|---|
| 5,502,566 A * | 3/1996 | Ai et al. ....................... | 356/514 |
| 6,018,990 A | 2/2000 | Ueki | |
| 2003/0035114 A1 | 2/2003 | Hill | |

FOREIGN PATENT DOCUMENTS

| | | |
|---|---|---|
| JP | 01 220440 A | 9/1989 |
| JP | A-02-253114 | 10/1990 |
| JP | A-08-086602 | 4/1996 |
| JP | A-09-243351 | 9/1997 |
| JP | A-2003-121131 | 4/2003 |

OTHER PUBLICATIONS

J. Grzanna et al.; "Absolute Testing of Flatness Standards at Square-Grid Points"; *Optics Communications*; vol. 77, No. 2, 3; Jun. 15, 1990; pp. 107-112.

Jürgen Grzanna; "Absolute Testing of Optical Flats at Points on a Square Grid"; *Applied Optics*; vol. 33, No. 28; Oct. 1, 1994; pp. 6654-6661.

* cited by examiner

*Primary Examiner*—Michael Nghiem
*Assistant Examiner*—Xiuqin Sun
(74) *Attorney, Agent, or Firm*—Oliff & Berridge, PLC

(57) ABSTRACT

The present invention provides a form measuring device including a measuring section (302) for obtaining measurement data obtained by measuring a space between a straightedge rule (321) and an edge of an object to be measured (305) paired with each other, a function value setting section for setting form-function values, which indicates distances from a reference line R to the straightedge rule (321) and to edges of the object to be measured, and angle-function values θ, which indicates internal angles of the object to be measured 305 and an angle formed by the straightedge rules (321), a simultaneous equation deriving section for deriving simultaneous equations for pairs each consisting of the straightedge rule (321) and an edge of the object to be measured (305) based on the measurement data, and a simultaneous equation processing section for processing the derived simultaneous equations.

9 Claims, 18 Drawing Sheets

FIG. 18

| | $X_0$ | $X_1$ | $X_2$ | ...... | $X_i$ | ...... | $X_n$ |
|---|---|---|---|---|---|---|---|
| (FIRST STRAIGHTEDGE RULE, FIRST EDGE) | $m_{11}(X_0)$ | $m_{11}(X_1)$ | $m_{11}(X_2)$ | ...... | $m_{11}(X_i)$ | ...... | $m_{11}(X_n)$ |
| (SECOND STRAIGHTEDGE RULE, SECOND EDGE) | $m_{22}(X_0)$ | $m_{22}(X_1)$ | $m_{22}(X_2)$ | ...... | $m_{22}(X_i)$ | ...... | $m_{22}(X_n)$ |
| (FIRST STRAIGHTEDGE RULE, SECOND EDGE) | $m_{12}(X_0)$ | $m_{12}(X_1)$ | $m_{12}(X_2)$ | ...... | $m_{12}(X_i)$ | ...... | $m_{12}(X_n)$ |
| (SECOND STRAIGHTEDGE RULE, THIRD EDGE) | | | | ⋮ | $m_{23}(X_i)$ | ⋮ | |
| (FIRST STRAIGHTEDGE RULE, THIRD EDGE) | | | | ⋮ | $m_{13}(X_i)$ | ⋮ | |
| (SECOND STRAIGHTEDGE RULE, FOURTH EDGE) | | | | ⋮ | $m_{24}(X_i)$ | ⋮ | |
| (FIRST STRAIGHTEDGE RULE, FOURTH EDGE) | | | | ⋮ | $m_{14}(X_i)$ | ⋮ | |
| (SECOND STRAIGHTEDGE RULE, FIRST EDGE) | | | | ⋮ | $m_{21}(X_i)$ | ⋮ | |
| (FIRST STRAIGHTEDGE RULE, SECOND STRAIGHTEDGE RULE) | $m_5(X_0)$ | | | ⋮ | $m_5(X_i)$ | ⋮ | |

FIG. 19

| | $X_0$ | $X_1$ | $X_2$ | ...... | $X_i$ | ...... | $X_n$ |
|---|---|---|---|---|---|---|---|
| (FIRST STRAIGHTEDGE RULE) | $L_1(X_0)$ | $L_1(X_1)$ | $L_1(X_2)$ | ...... | $L_1(X_i)$ | ...... | $L_1(X_n)$ |
| (SECOND STRAIGHTEDGE RULE) | $L_2(X_0)$ | $L_2(X_1)$ | $L_2(X_2)$ | ...... | $L_2(X_i)$ | ...... | $L_2(X_n)$ |
| (FIRST EDGE) | $S_1(X_0)$ | $S_1(X_1)$ | $S_1(X_2)$ | ...... | $S_1(X_i)$ | ...... | $S_1(X_n)$ |
| (SECOND EDGE) | $S_2(X_0)$ | $S_2(X_1)$ | $S_2(X_2)$ | ...... | $S_2(X_i)$ | ...... | $S_2(X_n)$ |
| (THIRD EDGE) | $S_3(X_0)$ | $S_3(X_1)$ | $S_3(X_2)$ | ...... | $S_3(X_i)$ | ...... | $S_3(X_n)$ |
| (FOURTH EDGE) | $S_4(X_0)$ | $S_4(X_1)$ | $S_4(X_2)$ | ...... | $S_4(X_i)$ | ...... | $S_4(X_n)$ |

FIG.20

| | |
|---|---|
| FIRST ANGLE | $\alpha$ |
| SECOND ANGLE | $\beta$ |
| THIRD ANGLE | $\gamma$ |
| FOURTH ANGLE | $\delta$ |
| POSTURE OF STRAIGHTEDGE RULE | $\theta$ |

FORM MEASURING DEVICE, FORM MEASURING METHOD, FORM ANALYSIS DEVICE, FORM ANALYSIS PROGRAM, AND RECORDING MEDIUM STORING THE PROGRAM

BACKGROUND OF THE INVENTION

1. Field of the Invention

The present invention relates to a form measuring device, a form measuring method, a form analysis device, a form analysis program, and a recording medium storing the program. More specifically, this invention relates to a form measuring device capable of accurately measuring irregularities or angular displacements of each surface of a flat polyhedron, or a form measuring device capable of analytically obtaining a form of a surface.

2. Description of Related Art

There have been used various measuring device and measuring methods for highly precisely measuring a form of an object.

As a first example, when accurately measuring the form of an object to be measured having polygonal flat surfaces, it is necessary to precisely measure irregularities and angles of each surface of the object to be measured. For instance, when measuring a form of a right-angled square, it is necessary to measure straightness of each edge and perpendicularity of each of the four right angles.

Conventionally, straightness of each edge has been measured, for instance, by scanning an object edge to be measured with a detector (such as for instance, an electrical micrometer) moving along a straightedge ruler to detect displacement from the straightedge ruler as a reference for straightness. On the other hand, perpendicularity has been measured by placing the right-angled square on and inside reference scales positioned with right angles to each other and measuring a distance from the reference scales to each edge of the right-angled square (Refer to, for instance, Document 1: Japanese Patent Laid-Open Publication No. HEI 9-2433351).

When measuring is performed by detecting displacement from a certain reference as described above, however, sometimes positional arrangement and posture of an object for measurement may disadvantageously be displaced against the reference in measurement, or the reference itself may disadvantageously include some manufacturing errors. When any of the displacements as described above (which are different from those occurring during measurement) exists, the displacement is included in a result of measurement, so that high precision measurement can not be expected.

For calibrating straightness, there has been proposed the three planes alignment method (three-flat method) as a measuring method not affected by a reference scale or positional arrangement and posture of an object for measurement in measurement (Refer to, for instance, Document 2: Japanese Patent Laid-Open Publication No. HEI 2-253114, Document 3: Japanese Patent Publication No. 2003-121131).

In the three planes alignment method, in each of the three pairs (A and B, B and C, and C and A) obtained by combining two of three rod-like objects for measurement (A, B, C), two objects (for instance, A and B) are placed at positions opposed to each other, and a distance between measuring surfaces facing to each other is measured at a plurality of points. Measurement of a distance between measuring surfaces is performed in each pair, and a solution satisfying the three pairs of objects for measurement is obtained through a simultaneous equation. With this operation, straightness of each object for measurement is calculated as a displacement from a virtual reference line. With the operations as described above, it is advantageously possible to assess straightness without being affected by any manufacturing error of a reference scale or positional arrangement and posture of the reference scale or an object for measurement.

With the three planes alignment method as described above, it is possible to accurately measure straightness of an object for measurement even when a scale with the straightness still unknown is used, but there is the problem that the capability is limited only to the on-dimensional calculation. In other words, there is the problem that, in relation to an object for measurement which is a flat polygon such as a right-angled square, even though straightness of each edge can be measured, perpendicularity of each angle formed with two edges can not be assessed. To overcome this problem, if it is tried to extend this one-dimensional calculation method to a two-dimensional calculation method for computing positional relations between edges, function values for solving the simultaneous equation disadvantageously increase.

In view of the circumstances as described above, it has been desired to provide a form measuring device and a form measuring method for a flat polyhedron enabling easy and high precision measurement of irregularities on and internal angles of each of the polygonal surfaces, a form measurement program for the method, and a recording medium for the program (First object).

As a second example, there has been known a method in which flatness of a surface is measure For instance, irregularities of a surface as an object for measurement are measured against a reference surface having been processed to a completely flat surface. As the method for flatness measurement as described above, for instance, there has been known the interference method in which the space between a surface to be measured and a reference surface, both positioned substantially in parallel to each other, is measured by detecting the interference pattern as shown in FIG. 15.

In FIG. 15, an optical interferometer 100 for measuring the distance before two surfaces comprises a light source 100 as a laser beam source, a CCD camera as a photographing device, and a half-mirror 103 provided on the light axis.

A reference object 201 having a reference surface D, which has been proposed into a completely flat surface, and an object to be measured 202 having a surface to be measured E are provided on the light axis of the optical interferometer 100 in the state in which the reference surface D and the surface to be measured E are positioned face to face substantially in parallel to each other. The reference surface D and the surface to be measured E are positioned vertically to the incident light from the light source 101. Both of reference object 201 and the object to be measured 202 are made of transparent material such as glass.

With the configuration as described above, when light from the light source 101 is introduced onto the object to be measured 202 and the reference object 201, interference is generated between the surface to be measured E and the reference surface D, and an interference pattern appears. When this interference pattern is observed by the CCD camera 102, spaces between the observed image and the reference surface D or the surface to be measured E are measured at each sampling point. In this step, irregularities of the surface to be measured E against the reference surface D are measured at each sampling point.

Here, it is assumed that the reference surface D has been manufactured to a completely flat surface, but it is actually impossible to process a reference surface to a completely flat surface. Since flatness of the surface to be measured E is measured based on spaces between the reference surface D and the surface to be measured E, when irregularities or undulations are present on the reference surface D, it is naturally impossible to accurately obtain flatness of the surface to be measured E.

In view of the circumstances as described above, it has been desired to provide a form measuring method capable of easily and precisely analyzing a form of a surface to be measured (second object).

SUMMARY OF THE INVENTION

The present invention can be utilized to obtain an accurate result of measurement by using a measuring section, a function value setting section, a simultaneous equation deriving section, and a simultaneous equation processing section to mutually measure positions of an object to be measured and apply the measurement data to the simultaneous equation to obtain a solution As measurement is carried out as described above, it is not required to use a specific reference for measurement such as a reference scale or a reference surface in this invention.

More specifically, the following configuration is employed in the present invention to achieve the first object described above.

The form measuring device according to the present invention comprises a measuring section having two straightedge rules for obtaining measurement data obtained by combining the straightedge rules with an object to be measured, which is a flat polyhedron, so as to oppose to each other, and measuring the spaces therebetween at a plurality of sampling points; a function value setting section for setting form-function values, which indicates distances from reference lines set for each edge of the object to be measured as well as for the straightedge rule to the straightedge rules and the edges of said object to be measured at sampling points, and angular function values which indicates internal angles of the object to be measured and an angle formed by the straightedge rules; a simultaneous equation deriving section for deriving simultaneous equations for pairs of the straightedge rule and each edge of the object to be measured using an angle formed with reference lines for the two straightedge rules and each internal angle of the object to be measured and assuming that a distance from the straightedge rule to the edge of the object to be measured is equal to a value obtained by adding the form-function value to a distance from the reference line of the straightedge rule to the reference line of the edge of the object to be measured and also that the relation between one of the straightedge rules and an edge of the object to be measured is expressed by a relation between the other straightedge rule and another edge of the straightedge rule; and a simultaneous equation processing section for solving the simultaneous equations derived as described above.

Herein, the reference line is, for ice, a least-squares line obtained by subjecting a measured surface of the straightedge rule and a measured surface along each edge of the object to be measured to the processing for least-squares recursion respectively.

On the other hand, to achieve the second object described above, the following configuration is employed in this invention. The form measuring device according to the present invention comprises a measuring section for combining two out of three surfaces to be measured substantially in parallel to each other as a pair in a specific pattern and respectively measuring a space therebetween at a plurality of sampling points, a function value setting section for setting form-function values, which indicates distances from reference planes respectively set for each of the surfaces to be measured to the surfaces to be measured a simultaneous equation deriving section for deriving simultaneous equations for a pair of the surfaces to be measured having a specific pattern assuming that a surface spacing between the surfaces to be measured placed in the specific pattern is equal to the sum of a distance from the reference plane to the surface to be measured and a distance between the reference planes set for the surfaces to be measured paired with each other, and a simultaneous equation processing section for processing the derived simultaneous equations.

With the configuration as described above, surfaces to be measured are arranged as pairs each in a specific pattern, and spaces therebetween are measured at a plurality of sampling points for each pair with a specific pattern. Then by deriving and solving equations satisfying the spaces between surfaces to be measured and form-function values, the form-function values can be obtained. Then a form of each surface to be measured can be obtained as a residual from the reference plane.

A form of a surface to be measured can be obtained by processing measurement data obtained by measuring surface spacing of each pair of surfaces to be measured each with the flatness still known, so that a form of an surfaces to be measured can be obtained without using a reference surface.

As a residual (form-function value) d from a reference plane can be computed at each point, so that not only assessment of flatness cm be made, but also irregularities of a surface of an object to be measured can be detected.

In the form measuring device according to the present invention, the met section preferably measures He spacing for the surface to be measured for five pairs which are: three pairs formed by combining two out of the three surfaces to be measured substantially in parallel to each other, one pair formed by rotating a surface to be measured of one of the above-mentioned three pairs by 90 degrees against the other surface, and another pair formed by displacing a surface to be measured of one of the above-mentioned three pairs in parallel to the other surface.

With the configuration as described above, measuring areas can be correlated to each other in each pair of surfaces to be measured, so that form-function values, which indicates a form of an surfaces to be measured, can be obtained by solving simultaneous equations. For instance, with only three pairs, each consisting of two surfaces to be measured positioned substantially in parallel to each other, corresponding areas are present only in the center line, so that a form of the surface can not be obtained by solving simultaneous equations, but when a pair in which one of the surfaces to be measured is relatively rotated and a pair in which one of the surfaces to be measured is translated are added, sufficient conditions are provided to correlate measuring areas to each other for solving simultaneous equations.

BRIEF DESCRIPTION OF THE DRAWINGS

FIG. 18 is a view showing measurement data in the second embodiment;

FIG. 19 is a view showing a from function value in the second embodiment;

FIG. 20 is a view showing an angle-function value in the second embodiment; and

DETAILED DESCRIPTION OF PREFERRED EMBODIMENT(S)

Figure 1:
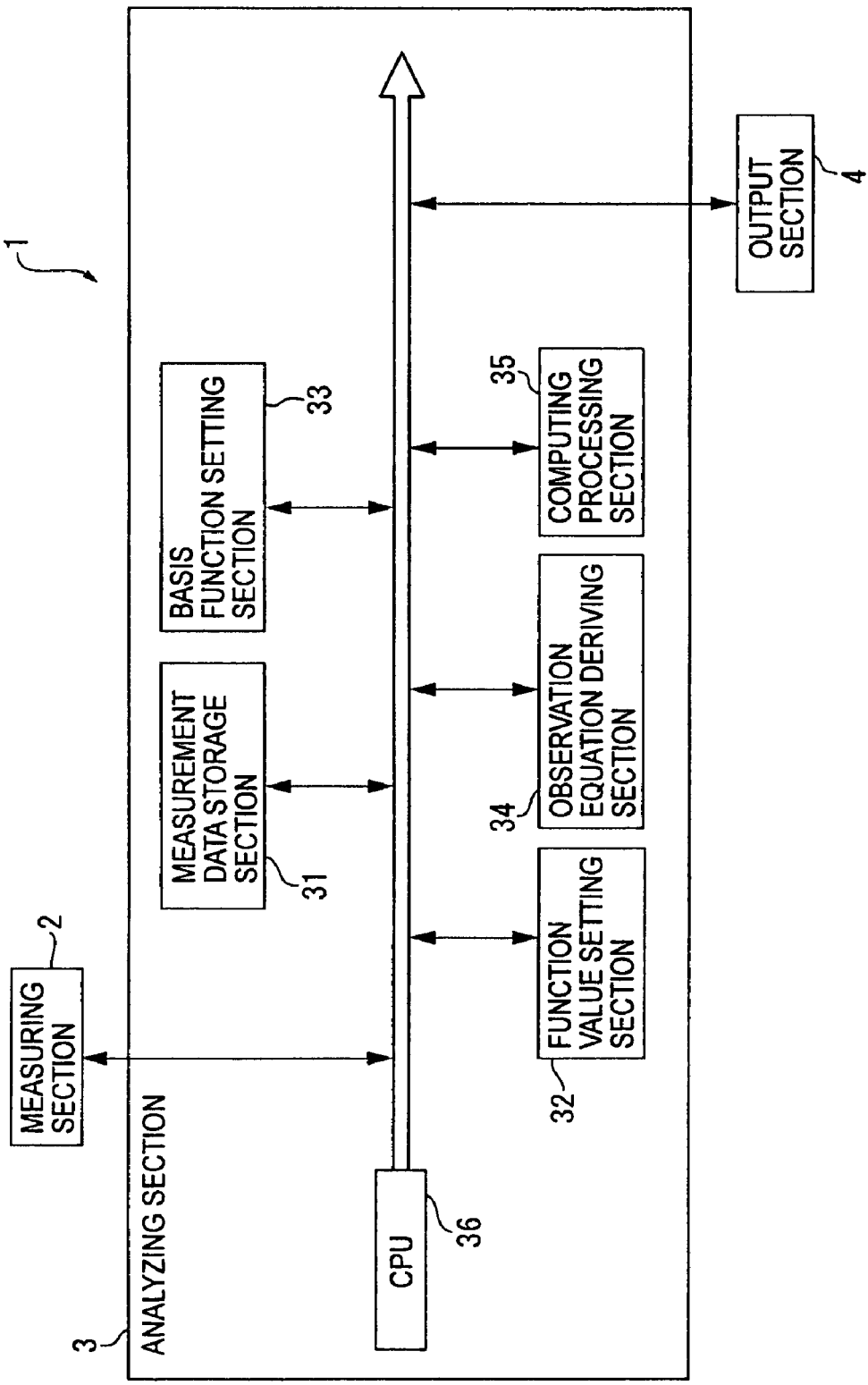
FIG. 1 is a view showing configuration of a form measuring device according to a first embodiment of the present invention.

Embodiments of the present invention are shown in the drawings, and are described with reference to reference numerals assigned to the components shown in the drawings.

First Embodiment

Embodiments of the present invention are shown in the drawings, and are described with reference to reference numerals assigned to the components shown in the drawings.

Configuration of a form measuring device according to a first embodiment of the present invention is shown in FIG. 1. The first embodiment relates to solution to aforesaid second object of the present invention.

The form measuring device 1 comprises a measuring section 2, an analyzing section (form analyzing device) 3, and an output section 4.

Figure 2:
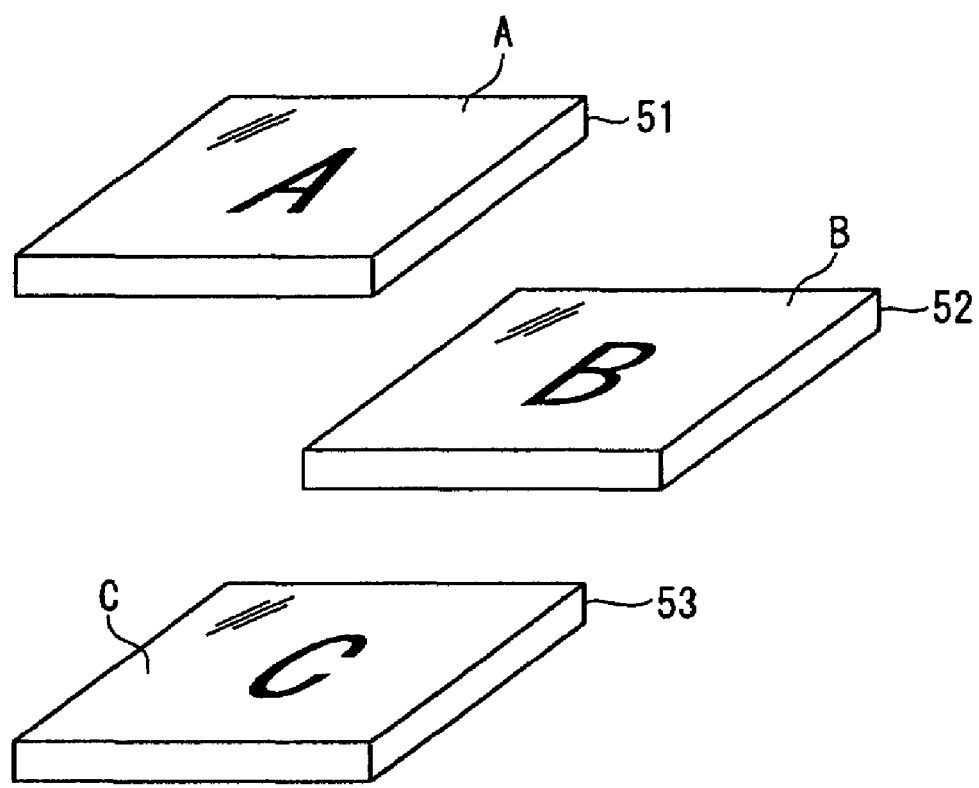
FIG. 2 is a view showing three surfaces to be measured.

The measuring section 2 measures a space m between surfaces to be measured at each sampling point in the state in which two out of three objects to be measured as shown in FIG. 2 are combined as a pair in a specific pattern.

Herein it is assumed there are prepared a first object to be measured 51, a second object to be measured 52, and a third object to be measured 53 as objects to be measured. The first object to be measured 51, second object to be measured 52, and third object to be measured 53 are formed with a light-transmissible material such as, for instance, glass.

The first object to be measured 51 has a first surface to be measured A on one surface thereof. The second object to be measured 52 has a second surface to be measured B on one surface thereof. The third object to be measured 53 has a third surface to be measured C on one surface thereof.

All of the first, second, and third surfaces to be measured A, B, C are surfaces each as an object to be measured, and all of the surfaces are processed into the substantially flat surface, but the flatness is unknown.

Configuration of the measuring section is not limited to any specific one so long as a space between surfaces to be measured paired and positioned substantially in parallel to each other can be measured. For instance, the measuring section 2 may comprise an optical interferometer as described in Description of Related Art.

In the measuring section 2, an surface spacing m is measured in the state in which the three surfaces to be measured A to C are combined to each other in a specific pattern and the combination pattern is described hereinafter with reference to FIG. 6 to FIG. 10.

The analyzing section 3 comprises a measurement data storage section 31, a function value setting section 32, a basis function setting section 33, an observation equation deriving section (simultaneous equation deriving section) 34, and an computing processing section (simultaneous equation processing section) 35. The analyzing section 3 comprises a central processing unit (CPU) 36, and operations of the measurement data storage section 31, function value setting section 32, basis function setting section 33, observation equation deriving section 34, and computing processing section 35 are controlled by the CPU 36 via a bus 37.

The measurement data storage section 31 stores therein measurement data obtained in the measuring section 2. Namely, the measurement data storage section 31 stored therein measurement data obtained by measuring surface spacing m between surfaces to be measured in the state where the surfaces to be measured A to C are combined as pairs each having a specific pattern at a plurality of sampling points.

The function value setting section. 32 stored therein function values set as unknown parameters, which indicates forms of the surfaces to be measured A to C respectively.

Operations for setting form-function values, which indicates forms of the surfaces to be measured A to C respectively, are now described below.

Figure 3:
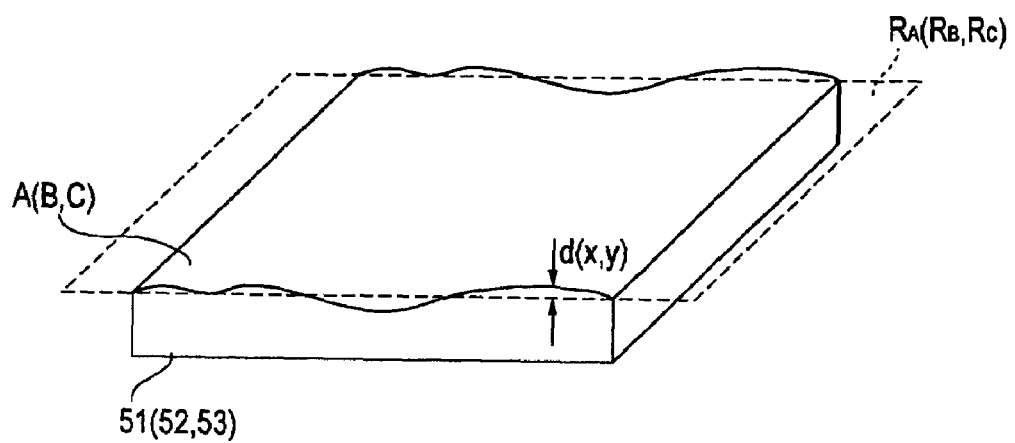
FIG. 3 is a view showing the state in which a reference plane is set on a surface to be measured in the first embodiment above.

Although each of the surfaces to be measured has irregularities, a reference plane R is virtually set for each of the surfaces to be measured as shown in FIG. 3. The reference plane R is a virtual plane set substantially in parallel to each of the surfaces to be measured A to C, and for instance, a least square plane of a form or a plane passing through the highest three points is set as a reference plane.

Then, as shown in FIG. 3, a residual (distance) d from the reference plane R to each of the surfaces to be measured A to C is set as a form-function value (function value setting step). Further the form-function value on a coordinate system set on each of the surfaces to be measured A to C is expressed as d (x, y).

With the form-function values d (x, y), irregularities on a surface to be measured are expressed as irregularities from the reference plane.

The basis function setting section 33 stores therein a basis function comprising a basis B (x, y) having a pair of elements linearly independent from each other. The basis B (x, y) is not limited to any specific function, but such functions as a spline function or Fourier series are available for this purpose.

The basis function is formed by applying a coupling factor $a=[a_1, a_2, \ldots a_p]$ to the bass B (x, y)=$[B_1 (x, y), B_2 (x, y), \ldots B_p (x, y)]$, and a residual (distance) d (x, y) between a reference plane and a surface to be measured is expressed by the following expression:

$$d(x, y) = \sum a_j B_j(x, y) = B(x, y) \cdot a \quad (1)$$
$$B(x, y) = [B_1(x, y) B_2(x, y) \ldots B_p(x, y)]$$
$$a = [a_1\ a_2\ \ldots a_p]^T$$

The observation equation deriving section 34 derives equations satisfied by the measurement data m (x, y) obtained in the measuring section 2 and the form-function value d (x, y) set in the function value setting section 32.

Figure 4:
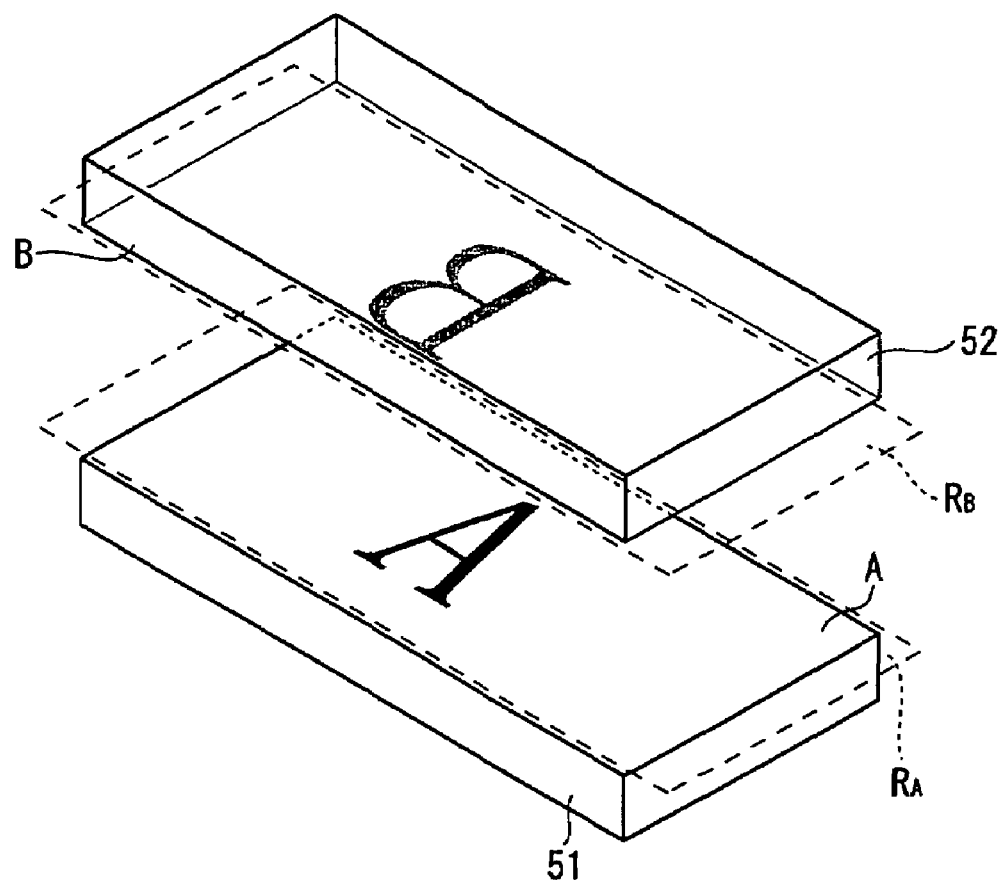
FIG. 4 is a view showing the state in which surfaces to be measured are placed face to face substantially in parallel to each other in the first embodiment.
Figure 5:
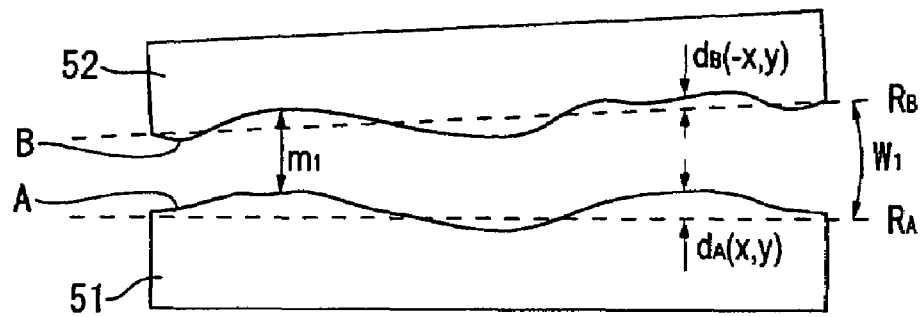
FIG. 5 is a view showing a relation between a surface spacing and a form-function value in the first embodiment.

For instance, as shown in FIG. 4, when the fir object to be measured 51 and the second object to be measured 52 are positioned in the state in which the first surface to be measured A and second surface to be measured B face to each other, because of the relation shown in FIG. 5, a distance $m_1$ (x, y) between the first surface to be measured A and the second surface to be measured B is expressed by the following equation:

$$m_1(x,y) = -d_A(x,y) - d_B(-x,y) + W_1(x,y) \quad (2)$$

Herein, as for the distance m between two surfaces, the direction in which the two surfaces get farther from each other is assumed as positive, but as for the residuals $d_A$, $d_B$, the direction in which the surface to be measured get farther from the reference plane is assumed as positive. Therefore the sign for the distance m between two surfaces is reverse to that for the residuals $d_A$, $d_B$.

Although a coordinate system is set on each of the first surface to be measured A and the second surface to be measured B respectively, the second surface to be measured is reversed against the axis Y as a symmetry axis to position the second surface to be measured against the first surface to be measured, so that coordinate values of a point on the second surface to be measured corresponding to the point (x, y) on the first surface to be measured is (-x, y).

Further a distance between a first reference plane $R_A$ as a reference plane for the first surface to be measured A and a second reference plane $R_B$ as a reference plane for the second surface to be measured B is expressed as $W_1$ (x, y).

A distance between surfaces to be measured is measured for each pair having a specific pattern in the measuring section 2, so that a plurality of observation equations equal to a total number of measuring points at which measurement is performed with the specific pattern respectively are derived.

The computing processing section 35 processes the equations derived in the observation equation deriving sections 34. Thus the residual d (x, y) is obtained, and thus a form of each surface to be measured is obtained as irregularity from the reference line.

Operations for measuring a form of surface with the form measuring device 1 having the configuration as described above is described below.

At first, in the measuring section 2, the surfaces to be measured A to C are positioned as pairs each having a specific pattern, and spaces between surfaces to be measured are measured at a plurality of sampling points for each pair (measuring step). Five patterns formed with pairs consisting two of the three surfaces to be measured A to C are shown in FIG. 6 to FIG. 10.

Figure 6:
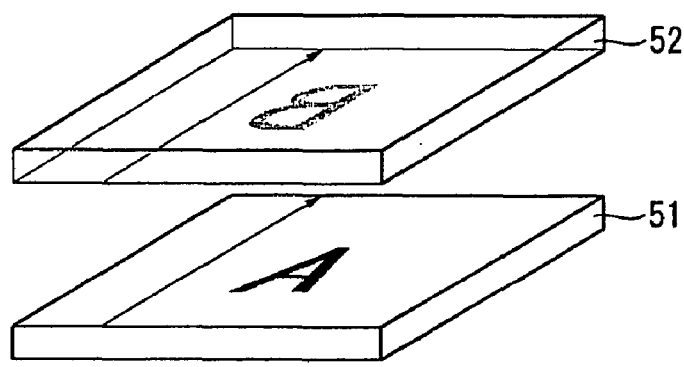
FIG. 6 is a view showing the state in which a first surface to be measured A and a second surface to be measure B are placed at positions opposed to each other in the first embodiment.
Figure 7:
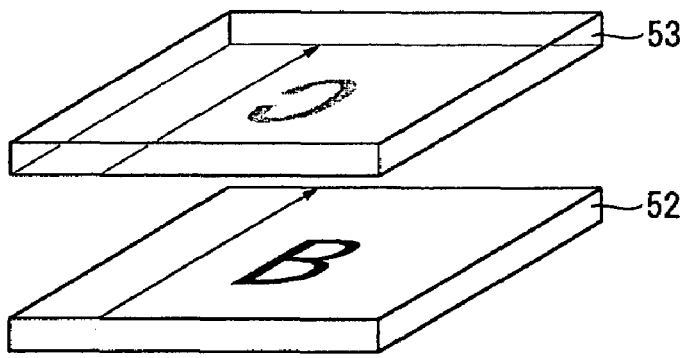
FIG. 7 is a view showing the state in which the second surface to be measured B and a third surface to be measured C are placed at positions opposed to each other in the first embodiment.
Figure 8:
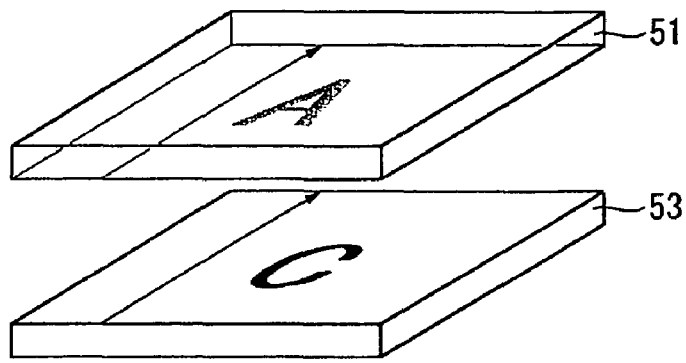
FIG. 8 is a view showing the state in which the third surface to be measured C and the first surface to be measured A are placed at positions opposed to each other in the first embodiment.
Figure 9:
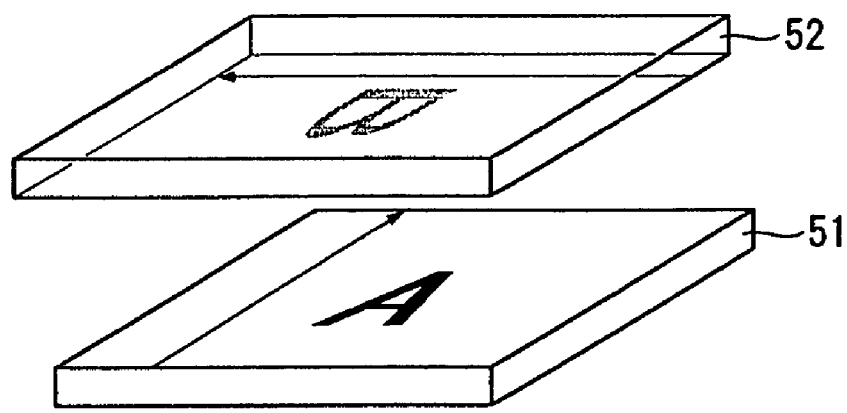
FIG. 9 is a view showing the state in which the second surface to be measured B is rotated by 90 degrees from the pattern shown in FIG. 6 showing the state in which the first surface to be measured A and the second surface to be measured B are placed at positions opposed to each other in the first embodiment.
Figure 10:
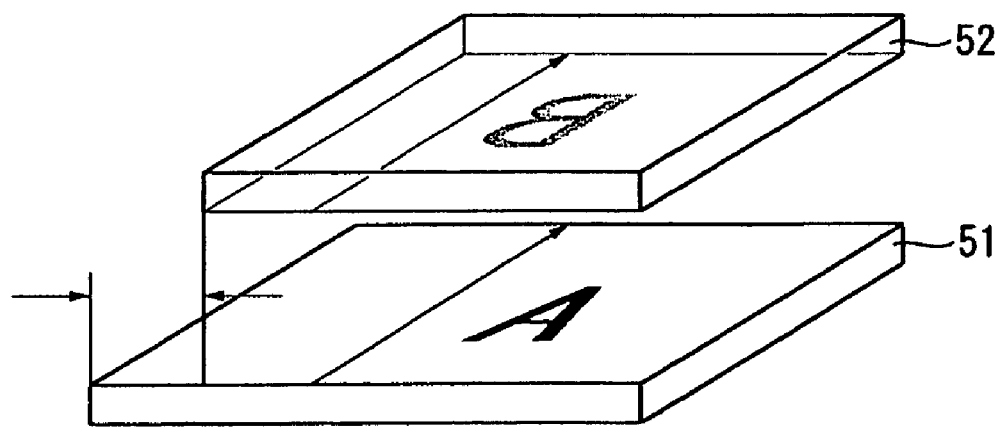
FIG. 10 is a view showing the state in which the second surface to be measured B is displaced in the X-axial direction from the pattern shown in FIG. 6 showing the state in which the first surface to be measured A and the second surface to be measure B are placed at positions opposed to each other in the first embodiment.

FIG. 6 to FIG. 8 show the cases in which two of the first to third surfaces to be measured A to C are combined face to face as a pair. FIG. 9 shows a case in which the second surface to be measured B is rotated by 90 degrees from the pattern shown in FIG. 6 in which the first surface to be measured A and the second surface to be measured B are positioned facing against each other. FIG. 10 is a pattern obtained by moving the second surface to be measured B in the X-axial direction from the pattern shown in FIG. 6 in which the first surface to be measured A and the second surface to be measured B are positioned facing against each other.

An arrow shown on each surface to be measured in each figure indicates the Y-axial direction on the surface to be measured. The direction perpendicular to the Y-axial direction on each surface to be measured is the X-axial direction.

The measuring section 2 measures spaces between surfaces to be measured for patterns shown in FIG. 6 to FIG. 10 at each sampling point.

The measurement data obtained in the measuring section 2 is stored in the measurement data storage section 31.

Then observation equations are derived by the observation equation deriving section 34.

When a surface to be measured is reversed against the axis Y as a symmetry axis, the residual d (form-function value) can be expressed as shown below. This indicates a form of a surface to be measured positioned in the upper side in each of FIG. 6 to FIG. 8.

$$d(-x, y) = \sum a_i B_i(-x, y) = B(-x, y) \cdot a \quad (3)$$
$$= B_R(x, y) \cdot a$$

-continued $$B_R(x, y) = B(-x, y)$$

When a surface to be measured is reversed against the axis Y as a symmetry axis and is further rotated by 90 degrees counterclockwise, the residual d (form-function value) can be expressed as shown below. This indicates a from of the second surface to be measured B positioned in the upper side in FIG. 9.

$$d(-y, -x) = \sum a_i B_i(-y, -x) = B(-y, -x) \cdot a = B_S(x, y) \cdot a \quad (4)$$

$$B_S(x, y) = B(-y, -x)$$

When a surface to be measured is reversed against the axis Y as a symmetry axis and then is shifted in the X-axial direction, the residual d can be expressed as shown below. This indicates a from of the second surface to be measured B positioned in the upper side in FIG. 10.

$$d(-x + \Delta x, y) = \sum a_i B_i(-x + \Delta x, y) \quad (5)$$
$$= B(-x + \Delta x, y) \cdot a$$
$$= B_T(x, y) \cdot a$$

$$B_T(x, y) = B(-x + \Delta x, y)$$

With the operations as described above, the spaces $m_k$ (k=1 to 5) between two of the three surfaces to be measured A to C for the patterns shown in FIG. 6 to FIG. 10 are expressed as shown below respectively (simultaneous equation deriving step).

$$m_1(x, y) = -d_A(x, y) - d_B(-x, y) + W_1(x, y) \quad (6)$$
$$= -B_A(x, y) \cdot a_A - B_{BR}(x, y) \cdot a_B + [x\ y\ 1] \cdot w_1$$

$$m_2(x, y) = -d_B(x, y) - d_C(-x, y) + W_2(x, y) \quad (7)$$
$$= -B_B(x, y) \cdot a_B - B_{CR}(x, y) \cdot a_C + [x\ y\ 1] \cdot w_2$$

$$m_3(x, y) = -d_C(x, y) - d_A(-x, y) + W_3(x, y) \quad (8)$$
$$= -B_C(x, y) \cdot a_C - B_{AR}(x, y) \cdot a_A + [x\ y\ 1] \cdot w_3$$

$$m_4(x, y) = -d_A(x, y) - d_B(-y, -x) + W_4(x, y) \quad (9)$$
$$= -B_A(x, y) \cdot a_A - B_{BS}(x, y) \cdot a_B + [x\ y\ 1] \cdot w_4$$

$$m_5(x, y) = -d_A(x, y) - d_B(-x + \Delta x, y) + W_5(x, y) \quad (10)$$
$$= -B_A(x, y) \cdot a_A - B_{BT}(x, y) \cdot a_B + [x\ y\ 1] \cdot w_5$$

Herein, the distance W (x, y) between reference planes is defined as shown below, wherein $w_k$ is a term indicating a relative posture of the reference plane.

$$[x\ y\ 1] \cdot w_k = [x\ y\ 1] \begin{bmatrix} \zeta_k \\ \eta_k \\ \xi_k \end{bmatrix} \quad k = 1 \sim 5 \quad (11)$$

$$w_k = \begin{bmatrix} \zeta_k \\ \eta_k \\ \xi_k \end{bmatrix}$$

When the equations (6) to (10) are expressed with a determinant, the following equations are obtained.

$$\begin{bmatrix} -B_A(x,y) & -B_{BR}(x,y) & 0 & [x\ y\ 1] & 0 & 0 & 0 & 0 \\ 0 & -B_B(x,y) & -B_{CR}(x,y) & 0 & [x\ y\ 1] & 0 & 0 & 0 \\ -B_{AR}(x,y) & 0 & -B_C(x,y) & 0 & 0 & [x\ y\ 1] & 0 & 0 \\ -B_A(x,y) & -B_{BS}(x,y) & 0 & 0 & 0 & 0 & [x\ y\ 1] & 0 \\ -B_A(x,y) & -B_{BT}(x,y) & 0 & 0 & 0 & 0 & 0 & [x\ y\ 1] \end{bmatrix} \begin{bmatrix} a_A \\ a_B \\ a_C \\ w_1 \\ w_2 \\ w_3 \\ w_4 \\ w_5 \end{bmatrix} = \begin{bmatrix} m_1(x,y) \\ m_2(x,y) \\ m_3(x,y) \\ m_4(x,y) \\ m_5(x,y) \end{bmatrix} \quad (12)$$

The computing processing section 35 obtains the coupling factor $a_i$ by solving the observation equation derived as described above (simultaneous equation processing step). In this step, it is required to add the conditions for deciding the relative posture $w_k$ of a reference plane, for instance, conditions defining three points through which the reference plane pass are provided for deciding a posture of the plane. Under the conditions, the coupling factor $a_i$ is obtained by the equation (12).

Then a form of each surface to be measured is defined according to the residual d (x, y) from the reference plane as shown below:

$$d_i(x, y) = \sum a_j B_j(x, y) = B_j(x, y) \cdot a \quad (13)$$

A result of processing is outputted to the output section 4. There is no specific restriction over the output section 4, and such devices as a monitor or a printer may be used for this purpose so long as the device can output a result of processing.

With the form measuring device 1 having the configuration as described above, there are provided the advantages as described below.

(1) Forms of surfaces s to be measured A to C can be obtained by processing measurement data concerning surface spacing for pairs of two out of three surfaces to be measured A to C each having still unknown flatness.

Therefore, forms of the surfaces to be measured A to C can be obtained without using any reference surface.

(2) A residual (form-function value) d (x, y) from a reference plane can be computed at each point, so that not only assessment of the flatness can be made, but also a surface form of each surface to be measured can be obtained.

(3) When basis B (x, y) is set and a residual (form-function value) d is expressed by means of linear coupling with the coupling factor $a_i$, if there are sufficient number of elements linearly independent for the basis B, a point corresponding to the measurement data can be included in the observation equation without fail. The elements linearly independent can be increased by, for instance, increasing the highest degree of the polynomial function. Therefore, there is not any specific restriction over the sampling point, and measurement data may be obtained at any point. Further it is not required to match the sampling point even in each of the patterns for pairs of two out of the surfaces to be measured A to C. As described above, management over the sampling point is not required, measuring work in the measuring section 2 is quite simple.

(4) When the basis is a polynomial equation, a degree of analysis of the form of the surfaces to be measured A to C can be changed by changing the order. For instance, by raising the order, irregularities on a surface can be obtained with high resolution, and when the order is lowered, undulation with a longer cycle can be obtained.

[Variant 1]

Variant 1 of the form measuring device according to the present invention is described below. The basic configuration of Variant 1 is the same as that in the first embodiment, but Variant 1 is characterized in that measurement data for pairs, in each of which one surface to be measured is rotated by a given angle against the other surface to be measured, is used.

In the first embodiment, five patterns each comprising a pair of two out of three surfaces to be measured A to C are shown in FIG. 6 to FIG. 10, and especially FIG. 9 shows a case in which the second surface to be measured B is rotated by 90 degrees from the pattern shown in FIG. 6 in which the first surface to be measured A and the second surface to be measured B are placed at positions opposed to each other.

Herein, when the form-function value d is expressed with the basis B (x, y), correspondence between the sampling points is not always required, so that the angle for rotation of the surface to be measured B in FIG. 9 is not limited to 90 degrees.

Figure 11:
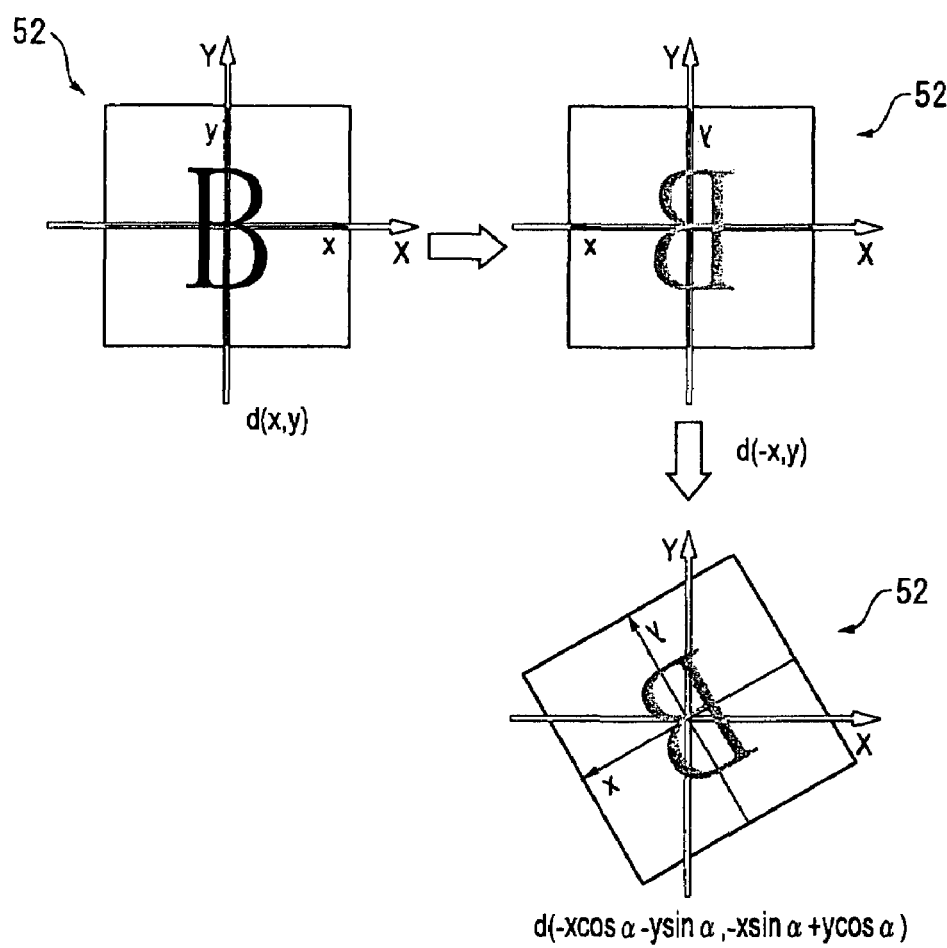
FIG. 11 is a view showing the state in which the second surface to be measured B is rotate by the angle α from the pattern shown in FIG. 6 showing the state in which the first surface to be measured A and the second surface to be measured B are placed at positions opposed to each other in Variant 1 of the form measuring device according to the present invention.

In Variant 1, as shown in FIG. 11 the surface to be measured B is reversed against the axis Y as a symmetry axis to be placed at position opposed to the surface to be measured A, and then is rotated by a given angle α.

The residual (form-function value) d is expressed as shown below:

$$d(-x\cos\alpha - y\sin\alpha, -x\sin\alpha + y\cos\alpha) = \quad (14)$$
$$\sum a_i B_i(-x\cos\alpha - y\sin\alpha, -x\sin\alpha + y\cos\alpha) =$$
$$B(-x\cos\alpha - y\sin\alpha, -x\sin\alpha + y\cos\alpha) \cdot a = B_a(x, y) \cdot a$$

An equation corresponding to the observation equation expressed by the equation (9) can be obtained by using the equation (14) in place of the equation (4). Forms of the surfaces to be measured A to C can be obtained by solving the equation corresponding to the equation (12) using the form-function value d.

With the configuration described above, there are provided the following advantages in addition to the advantages in the embodiment described above.

Figure 12:
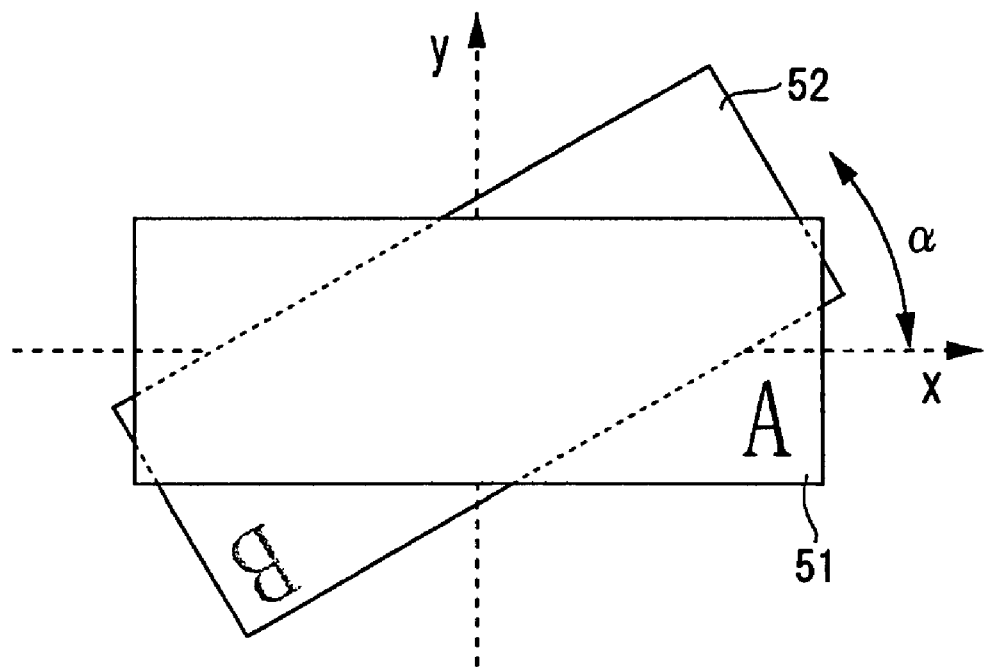
FIG. 12 is a view showing the case in which an surface to be measured is a rectangle in the variant 1 above.

(5) The rotation angle of the surface to be measured B is not limited to 90 degrees, and the surface to be measured B may be rotated by any angle, so that it is possible to select an angle allowing for utmost overlaid area as shown, for instance, in FIG. 12. For instance, even a rectangular surface to be measured can be rotated by an angle allowing for a large overlaid area. As the overlaid area is larger, also an analyzable area becomes larger.

[Variant 2]

Next Variant 2 of the form measuring device according to the present invention is described. The basic configuration of Variant 2 is the same as that in the first embodiment, but Variant 2 is characterized in that a form-function value is obtained by using simultaneous equations in place of a basis.

In the first embodiment, there is not specific restriction over the sampling points for obtaining measurement data concerning surface spacing in each of the pairs shown in FIG. 6 to FIG. 10.

In variant 2, however, identical sampling points are set in all of the pairs shown in FIG. 6 to FIG. 10. For instance, an inter-plane distance is measured at each lattice point. The shift rate for the surface to be measured B shown in FIG. 10 is a rate to which a measuring point corresponds after shifted. For instance, shifting is performed by one lattice unit:

As all sampling points are identical for all of the pairs, the observation equation at each sampling point can be derived as shown below:

$$m_1(x,y) = -d_A(x,y) - d_B(-x,y) + W_1(x,y)$$
$$m_2(x,y) = -d_B(x,y) - d_C(-x,y) + W_2(x,y)$$
$$m_3(x,y) = -d_C(x,y) - d_A(-x,y) + W_3(x,y)$$
$$m_4(x,y) = -d_A(x,y) - d_B(-y,-x) + W_4(x,y)$$
$$m_5(x,y) = -d_A(x,y) - d_B(-x+\Delta x, y) + W_5(x,y) \quad (15)$$

The form-function value d can be obtained by solving the equation (15), and forms of the surfaces to be measured A to C can be obtained as irregularities from the reference planes.

In this step, as the angle for rotating the surface to be measured B in FIG. 9 is limited to 90 degrees, the overlaid area when the surface to be measured B is rotated by 90 degrees should preferably be sufficiently large. For instance, the surface to be measured should preferably be square or round.

The present invention is not limited to the embodiment described above, and modifications and improvements in the range in which the objects of the present invention can be achieved are included within a scope of the present invention.

Figure 13:
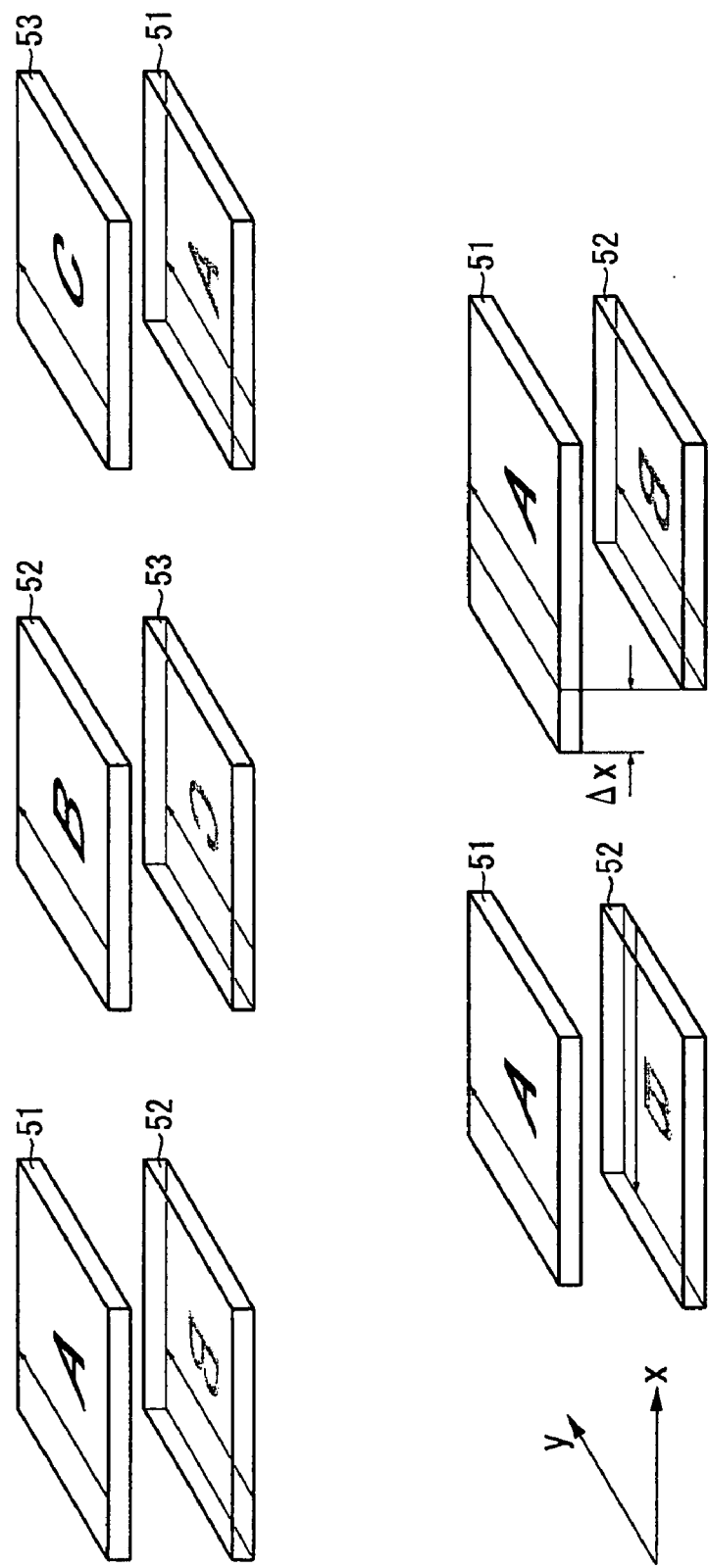
FIG. 13 is a view showing the state in which surfaces to be measured are placed opposed to each other with both of the top surfaces facing outward.

The description above assume the case in which an inter-plane distance is measured in the state where the surfaces to be measured A to C are placed face to face each other, but it is needless to say that a space between two of the surfaces to be measured A to C may be measured in the state where the two surfaces to be measured are placed each facing outward as shown in FIG. 13.

Figure 14:
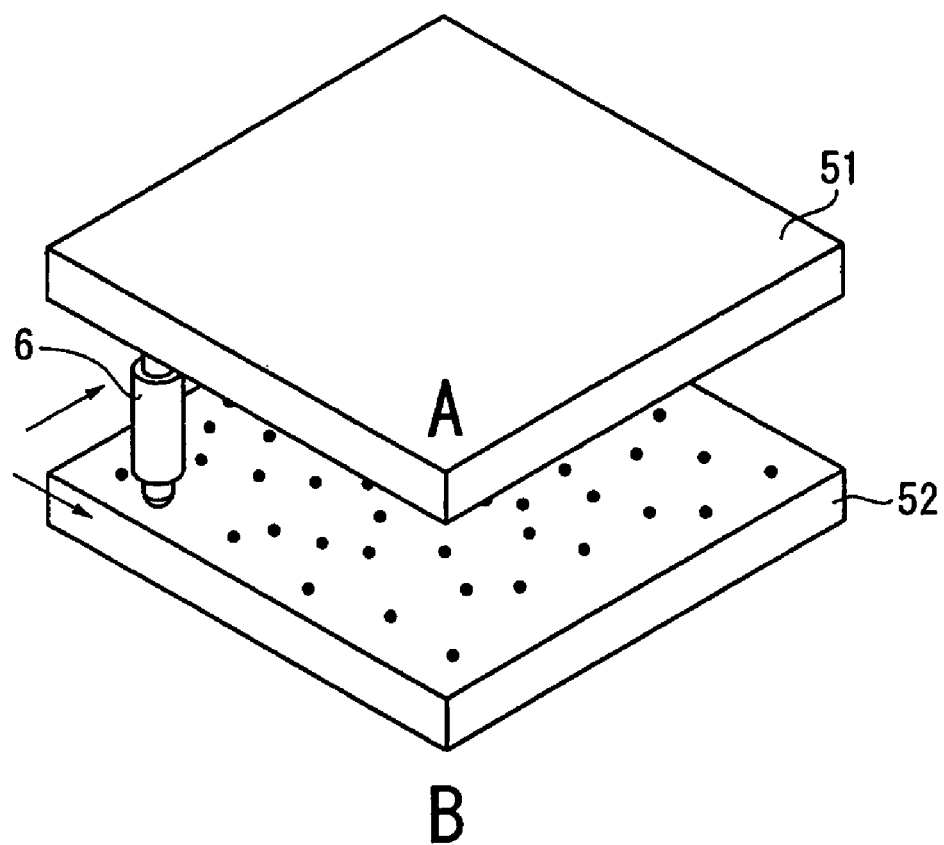
FIG. 14 is a view showing the state in which an surface spacing is measured with an electrical micrometer.
Figure 15:
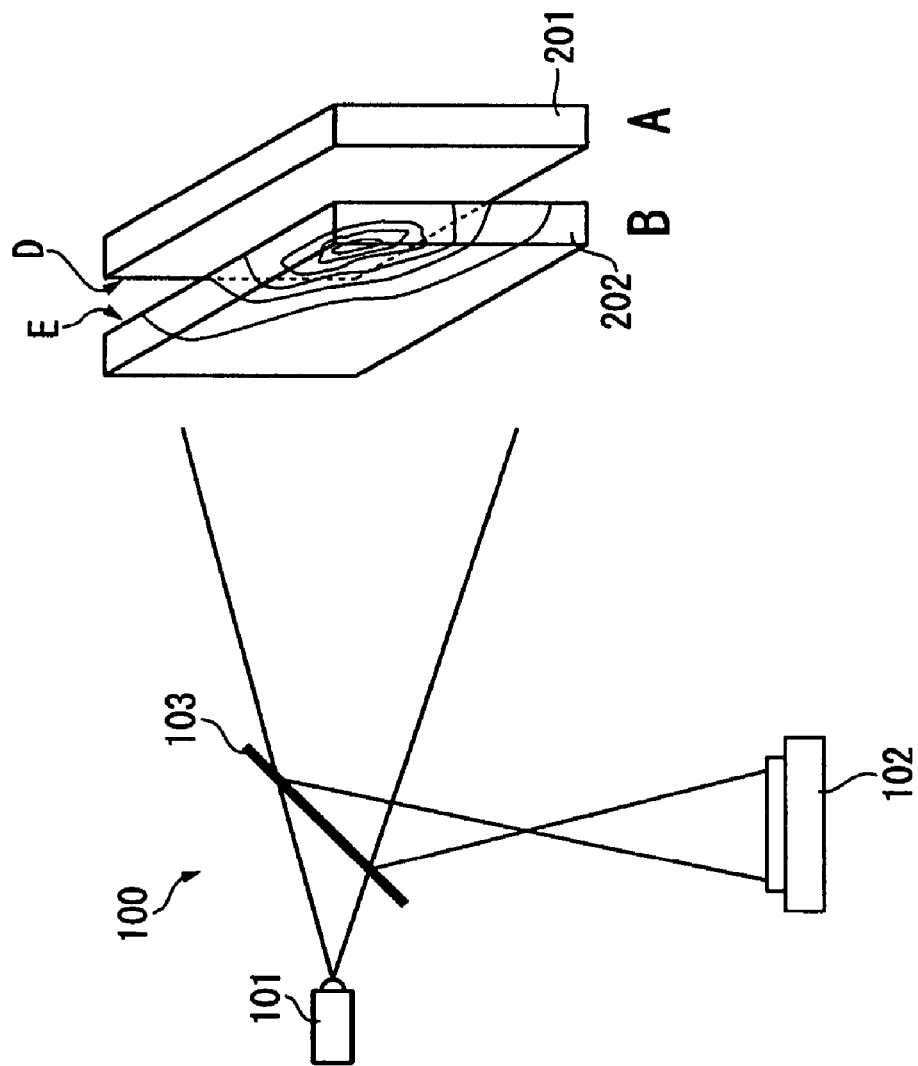
FIG. 15 is a view showing the state in which an optical interferometer is used in a method of measuring a form of a surface to be measured based on the conventional technology.

Descriptions of the measuring section 2 above assume the use of the optical interferometer 100, but it is needless to say, for instance, as shown in FIG. 14, that a space between two planes may be measured with the electric micrometer 6 or the like. The black circle in FIG. 14 indicates a sampling point.

Although it is assumed in the descriptions above that each of the objects to be measured 51 to 53 is made of a transparent material, there is not any specific restriction over a material for and a form of the object to be measured.

Second Embodiment

Figure 16:
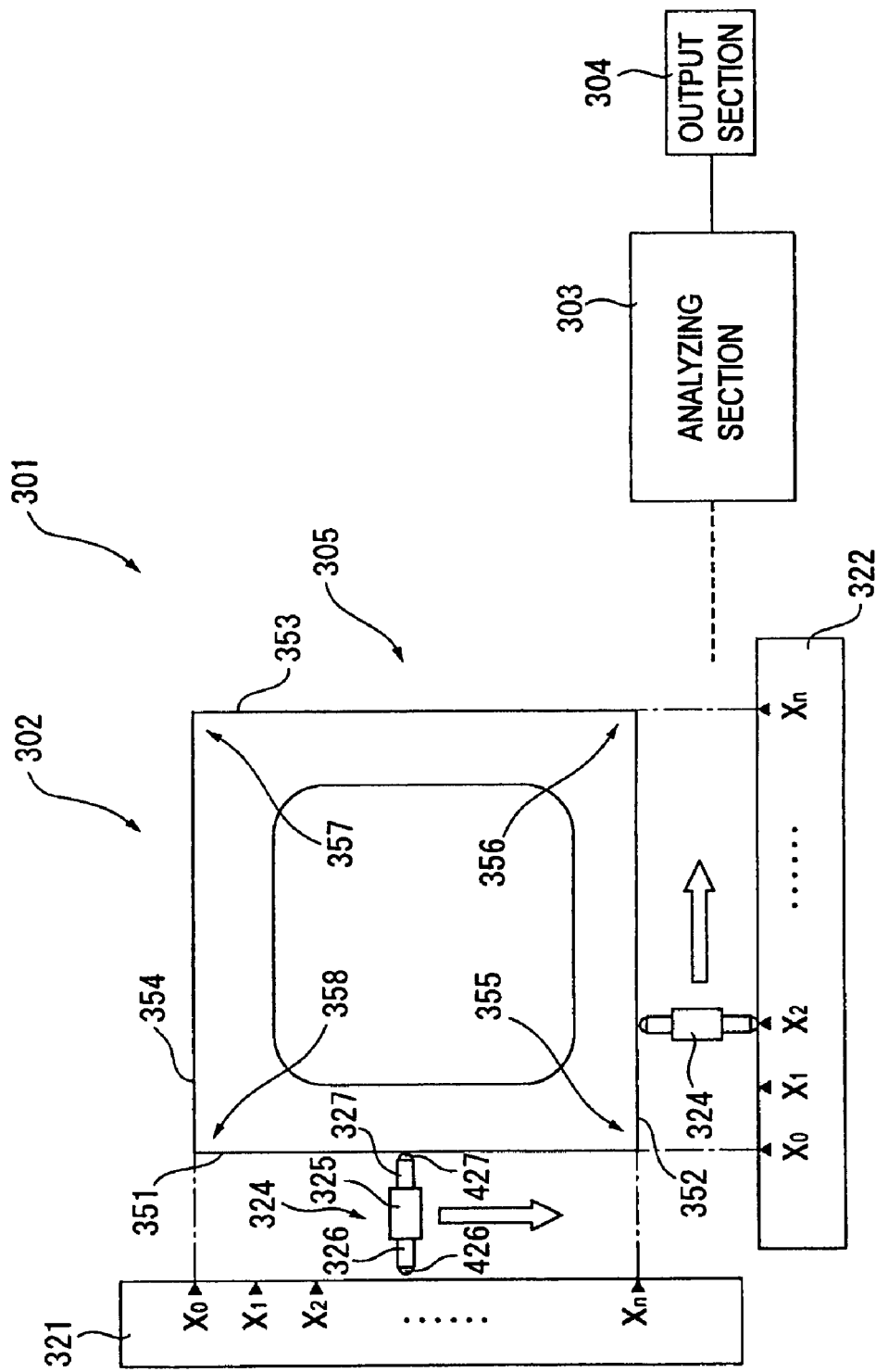
FIG. 16 is a view showing a form measuring device according to a second embodiment of the present invention.

FIG. 16 shows configuration of a form measuring device according to a second embodiment of the present invention The second embodiment relates to solution to aforesaid first object of the present invention.

A form measuring device 301 comprises two straightedge miles 321, 322 and comprise a measuring section 302 for obtaining measurement data obtained by measuring spaces m between the straightedge rules 321, 322 and four edges (351 to 354) of a object to be measured 305 in each of different pairs at a plurality of points, an analyzing section (a form analyzing device) 303 for analyzing a form of an object to be measured by processing the obtained measurement data, and an output section 304 for outputting a result of analysis.

The measuring section 302 comprises the two straightedge rules 321, 322 placed in the state in which extension lines from the rules cross each other at specific angles, a length measuring sensor 324 for measuring spaces between the object to be measured 305, which is placed at positions when each of edges (351 to 354) thereof faces straightedge rules 321, 322, and the straightedge rules 321, 322 at a plurality of points, and a moving mechanism (not shown) for moving the length measuring sensor 324 in the longitudinal directions of the straightedge rules 321, 322.

There are provided the two straightedge rules 321, 322, which arm placed with an angle(smaller than 180 degrees) formed thereby and sufficient for accommodating the object to be measured 305 therein. The two straightedge rules 321, 322 are positioned with an angle equal to the maximum internal angle (355 to 358) of the object to be measured 305. For instance, when the object to be measured 305 is a right-angled square, the two straightedge rules 321, 322 are positioned so that extension lines thereof form a substantially right angle. Detected surfaces of the straightedge rules 321, 322 facing toward the object to be measured 305 should preferably be machined to as much straight state as possible, but this measuring method is not affected by the machining errors in the straightedge rules 321, 322, so that the straightedge rules 321, 322 are not always required to be machined to the completely straight state.

The straightedge rules 321, 322 are required to have corresponding points opposed to points on edges (351 to 354) of the object to be measured 305, and therefore are required to have the length at least equal to or more than the longest edge of the object to be measured 305.

Herein one of the straightedge rules is described as a first straightedge rule 321, and the other straightedge rule as a second straightedge rule 322.

The length measuring sensor 324 measures a space m between the straightedge rules 321, 322 and the object to be measured 305 at a specified sampling pitch. The length measuring sensor 324 can move in the longitudinal direction of the straightedge rules 321, 322.

The length measuring sensor 324 comprises a tubular main body section 325 provided movable in the longitudinal directions of the straightedge rules 321, 322, a first spindle 326 and a second spindle 327 provided movable in the contrary directions from the main body section 325 respectively, and a detecting section (not shown) for detecting a travel of each of the first spindle 326 and the second spindle 327. Contactors 426, 427 contacting the object to be measured are provided at tips of the first spindle 326 and the second spindle 327.

When the object to be measured 305 is placed at a position where the edges (351 to 354) thereof face the two straightedge rules 321, 322, the length measuring sensor 324 directs the first spindle 326 toward the straightedge rule 321 (322) between the straight stale 321, 322 and the object to be measured 305, and also directs the second spindle 327 toward the object to be measured 305. When the length measuring sensor 324 moves along the straightedge rules 321, 322, the first spindle 326 and the second spindle 327 are moved forward or backward according to irregularities on surfaces of the straightedge rules 321, 322 as well as on the object to be measured 305, and a distance m between the straightedge rules 321, 322 and edges (351 to 354) of the object to be measured 305 is detected from the sum of total travels of the first spindle 326 and the second spindle 327.

The moving mechanism is not shown, and comprises, for instance, driving shafts provided along the straightedge rules 321, 322, and a slider capable of sliding on each of the driving shafts. The length measuring sensor 324 may be attached to the slider so that the length measuring sensor 324 can move together with the slider. The slider is preferably capable of setting the moving pitch according to a sampling pitch of the length measuring sensor 324.

Although not shown, there is preferably provided a mount base machined into the substantially flat state for mounting the straightedge rules 321, 322 and the object to be measured 305, and further there is preferably provided a positioning unit for deciding positions of the straightedge rules 321, 322 and the object to be measured 305. Any type of positioning unit may be employed such as a positioning pin projecting from the mount base or a positioning plate, and still further it is preferable that the positioning pin or the positioning place can move and also can be fixed at a given position.

Figure 17:
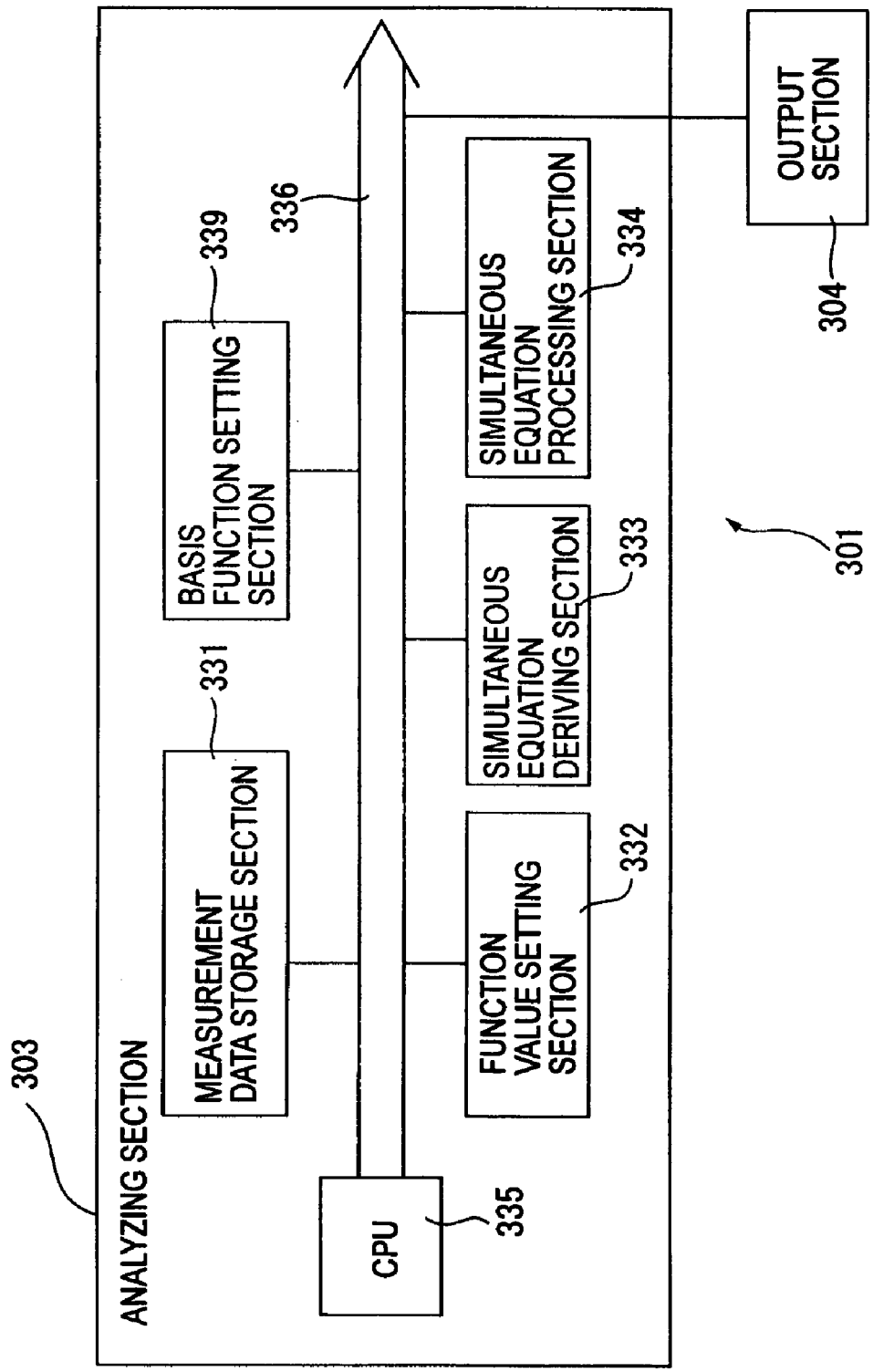
FIG. 17 is a view showing configuration of an analyzing section in the second embodiment.

The analyzing section 303 comprises, as shown in FIG. 17, a measurement data storage section 331 for storing therein measurement data obtained in the measuring section 302, a function value setting section 332 for setting function values indicating forms of the straightedge rules 321, 322 and the object to be measure 305, a simultaneous equation deriving section 333 for deriving simultaneous equations indicating relations between the measurement data and the function values set therein, a simultaneous equation processing section 334 for solving the derived simultaneous equations and a central control unit (CPU) b 335 controlling operations of the analyzing section 303. These measurement data storage section 331, function value setting section 332, simultaneous equation deriving section 333, simultaneous equation processing section 334, and CPU 335 are connected to each other though a bus 336.

The measurement data storage section 331 stores therein the measurement data obtained in the measuring section 302, and for instance, stores therein a distance m ($x_i$) at each sampling point $x_i$ for a pair of each of the straightedge rules 321, 322 and each of edges (351 to 354) of the object to be measured 305.

The function value setting section 332 stores therein function values set as unknown parameters indicating forms of the straightedge rules 321, 322, forms of the object to be measured 305, internal angles of the object to be measured, and postures of the straightedge rules 321, 322 as shown in FIG. 19 and FIG. 20 (function value setting step).

Operations for setting form-function values ($L_1$, $L_2$, $S_1$, $S_2$, $S_3$, $S_4$, ...) indicating forms of edges of the object to be measured 305 and those of the straightedge rules 321, 322.

Figure 21:
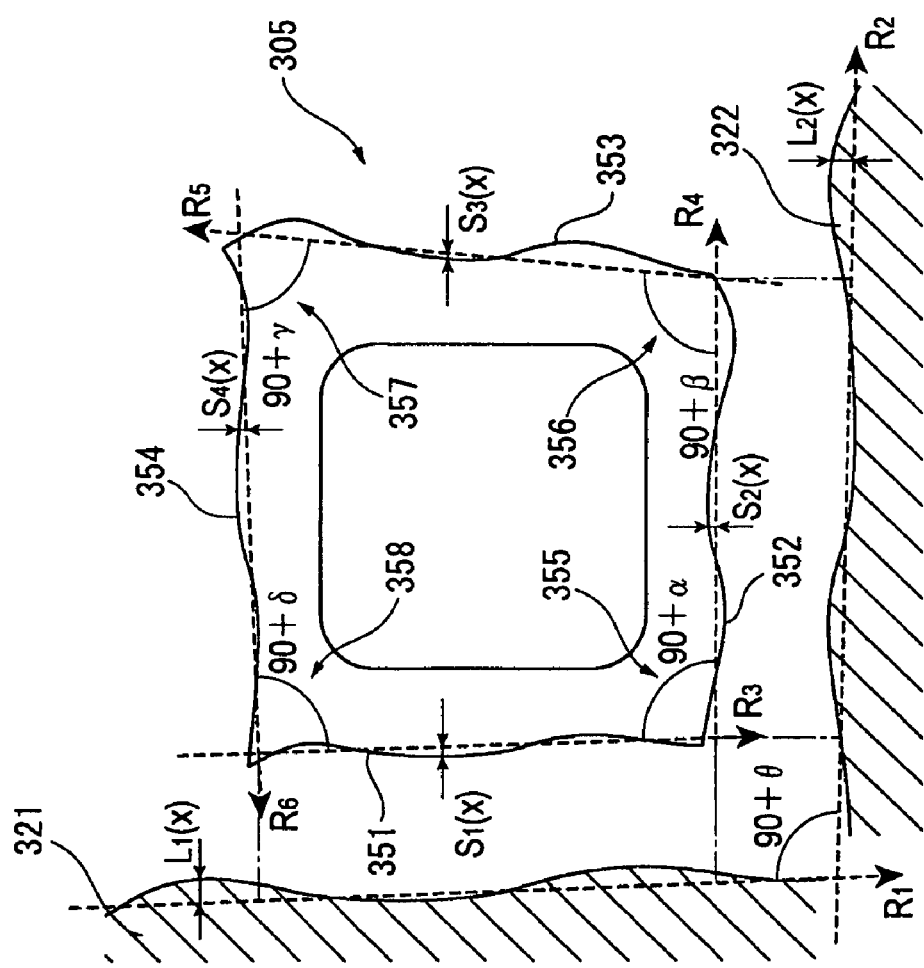
FIG. 21 is a view showing a reference line, a form-function, and an angle-function.

Although detected surfaces of the edges (351 to 354) of the object to be measured 305 to be detected and also detected surfaces of edges of the straightedge rules 321, 322 have irregularities, reference lines ($R_1$ to $R_6$) for linearly regressing the edges to be detected as shown in FIG. 21 are virtually set. Further a residual (distance) from any of the reference lines ($R_1$ to $R_6$) set virtually to the detected surface is set as a form-function value. The reference lines $R_1$ to $R_6$ are, for instances least self-square straight lines.

$L_1$ indicates a residual for the first straightedge rule 321 from the reference line $R_1$ and a form-function value $L_1(x_i)$ indicates a residual at the sampling point $x_i$ (Refer to FIG. 19). Similarly, $L_2(x_i)$ indicates a residual for the second straight light 322 at the sampling point $x_i$.

Further $S_1$ indicates a residual for the first edge 351 of the object to be measured 305 from the reference line $R_3$, and $S_1(x_i)$ indicates a residual at the sampling point $x_i$. Similarly form-function values $S_2(x_i)$, $S_3(x_i)$, $S_4(x_i)$ ... indicate residuals for the second edge 352, third edge 353, fourth edge 354 ... of the object to be measured 305 respectively.

With the form-function values ($L_1$, $L_2$, $S_1$, $S_2$, $S_3$, $S_4$, ...), irregularities on the detected edges (351 to 354) of the objects to be measured 305 and those on the detected surfaces of edges of the straightedge rules 321, 322 are expressed as irregularities form the reference lines ($R_1$ to $R_6$).

Next operations for setting angle-function values indicating internal angles (355 to 358) of the object to be measured 305 are described below.

Internal angles (355 to 358) of the object to be measured 305 as a polygon (for instance, having n angles) are off from 180×(n−2)/n, and the angular differences between these internal angles (355 to 358) and an internal angle of the regular polygon(having n angles) is set as an angle-function value. Assuming, for instance, that internal angles of a top plane of the object to be measured 305 are a first angle 355, a second angle 356, a third angle 357, a fourth angle 358 ..., the angular differences of these internal angles from 180×(n−2)/n are set as $\alpha$, $\beta$, $\gamma$, $\delta$ ... respectively. The internal angles (355 to 358) of the object to be measured 305 are defined as those formed by the reference lines ($R_3$ to $R_6$) for the edges (351 to 354). For instance, when the object to be measured 305 is a right-angled square, the angle function-value is set as a deviation from 90 degrees. Namely, internal angles of a right-angled square are expressed as 90°+$\alpha$ for the first angle (355), 90°+$\beta$ for the second angle (356). 90°+$\gamma$ for the third angle, and 90°+$\delta$ for the fourth angle (358).

A function value indicating postures of the two straightedge rules 321, 322 is expressed as a difference from 180×(n−2)/n like in the case of the internal angles of the object to be measured 305, and an angular difference of an angle formed by the reference lines $R_1$, $R_2$ for the two straightedge rules 321, 322 from 180×(n−2)/n is expressed as an angular-function value $\theta$.

The internal angles (355 to 358) of the object to be measured 305 are expressed by these angle-function values ($\alpha$, $\beta$, $\gamma$, $\delta$ ...).

The simultaneous equation deriving section 333 derives equations satisfied by the measurement data m (xi) obtained in the measuring section 302 as well as by the form-function values 1 (xi), S(xi) and the angle-function values $\alpha$ to $\gamma$ set in the function value setting section 332 (simultaneous equation deriving step). The process of deriving the equations set in the simultaneous equation deriving section 333 is briefly described below.

Distances between the reference lines $R_1$, $R_2$ for the straightedge rules 321, 322 and the reference lines $R_3$ to $R_6$ for the edges (351 to 354) of the object to be measured 305 are expressed by D, and for instance, the distance between the reference line $R_1$ for the first straightedge rule 321 and the reference line $R_1$ for the first edge (351) of the object to be measured 305 is expressed by $D_{11}$. Then the following equation is established between the first straightedge rule 321 and the first edge 351 of the object to be measured 305:

$$m_{11}(X_i) = L_1(X_i) + S_1(X_i) + D_{11}(X_i) \tag{16}$$

Similarly, the following equations are established between the straightedge rules 321, 322 and the edges (351 to 354) of the object to be measured 305 such as the second straightedge rule 322 and the second edge 352.

$$m_{22}(Xi) = L_2(Xi) + S_2(Xi) + D_{22}(Xi) \tag{17}$$

$$m_{12}(Xi) = L_1(Xi) + S_2(Xi) + D_{12}(Xi) \tag{18}$$

$$\vdots$$

$$m_{21}(Xi) = L_2(Xi) + S_1(Xi) + D_{21}(Xi) \tag{19}$$

When the distance between reference lines $R_1$, $R_2$ in the state where the first straightedge rule 321 and the second straightedge rule 322 are positioned substantially in parallel to each other, the following equation is derived:

$$m_5(X_i) = L_1(X_i) + L_2(X_i) + D_5(X_i) \tag{20}$$

In a pair of reference lines, when a slope of one of the reference lines against the other is "u" and a distance between the reference lines at the sampling point $x_0$ is "w", the distance D between the reference lines is expressed by a linear expression using the "u" and the "w". For instance, the distance $D_{11}$, between the first reference line $R_1$ for the first straightedge rule 321 and the reference line $R_3$ for the first edge 351 is expressed by the following equation using the gradient $u_{11}$ and the segment $w_{11}$:

$$D_{11} = (Xi, 1)\begin{pmatrix} u_{11} \\ w_{11} \end{pmatrix} \tag{21}$$

Similarly, the distance $D_{22}$ between the reference line $R_2$ for the second straightedge rule 322 and the reference line $R_4$ for the second edge 352 is likely expressed by using the gradient $u_{22}$ and the segment $w_{22}$, and the same is true also for other cases.

$$D_{22} = (Xi, 1)\begin{pmatrix} u_{22} \\ w_{12} \end{pmatrix} \tag{22}$$

$$D_{12} = (Xi, 1)\begin{pmatrix} u_{12} \\ w_{12} \end{pmatrix} \tag{23}$$

$$D_{21} = (Xi, 1)\begin{pmatrix} u_{21} \\ w_{21} \end{pmatrix} \tag{24}$$

-continued $$D_5 = (Xi, 1)\begin{pmatrix} U_5 \\ W_w \end{pmatrix} \quad (25)$$

A relation between the second straightedge rule 322 and an edge (351 to 354) of the object to be measured 305 is expressed with the relation between the first straightedge rule 321 and the edge (351 to 354) of the object to be measured 305 using an angle (angle-function value θ) formed by the reference lines $R_1$, $R_2$ for the first straightedge rule 321 and the second straightedge rule 322 and each internal angle (angle-function value α, β, . . . ) of the object lo be measured 305. For instance, the gradient $u_{22}$ of the reference line $R_2$ for the second straightedge rule 322 against the reference line R for the second edge 352 is expressed by the gradient $u_{11}$ of the reference line $R_1$ for the first straightedge rule 321 against the reference line $R_3$ for the first edge 351 as shown in the following equation:

$$U_{22} = U_{11} - \alpha + \theta \quad (26)$$

Similarly, a relation between the pair consisting of an edge of the object to be Measured 305 and the first straightedge rule 321 and the pair consisting of an edge adjoining that of the object to be measured 305 and the second straightedge rule 322 is in the state where a relative posture of one pair is expressed by a relative posture of another pair. For instance, in a case of a right-angled square, the following equations are derived:

$$U_{23} = U_{12} - \beta + \theta \quad (27)$$

$$U_{24} = U_{13} - \gamma + \theta \quad (28)$$

$$U_{21} = U_{14} - \delta + \theta \quad (29)$$

By substituting the equations (21) to (25) and equations (26) to (29) into the equations (16) to (20) derived from the distance m between the straightedge rules 321, 322 and edges (351 to 354) of the object to be measured 305, the following equations can be obtained:

$$m_{11}(Xi) = L_1(Xi) + S_1(Xi) + (Xi, 1)\begin{pmatrix} U_{11} \\ W_{11} \end{pmatrix} \quad (30)$$

$$m_{22}(Xi) = L_2(Xi) + S_2(Xi) + (Xi, 1)\begin{pmatrix} U_{11} - \alpha + \theta \\ W_{22} \end{pmatrix} \quad (31)$$

$$m_{12}(Xi) = L_1(Xi) + S_2(Xi) + (Xi, 1)\begin{pmatrix} U_{12} \\ W_{12} \end{pmatrix} \quad (32)$$

$$m_{23}(Xi) = L_2(Xi) + S_3(Xi) + (Xi, 1)\begin{pmatrix} U_{12} - \beta + \theta \\ W_{23} \end{pmatrix} \quad (33)$$

$$m_{13}(Xi) = L_1(Xi) + S_4(Xi) + (Xi, 1)\begin{pmatrix} U_{13} \\ W_{13} \end{pmatrix} \quad (34)$$

$$m_{24}(Xi) = L_2(Xi) + S_4(Xi) + (Xi, 1)\begin{pmatrix} u_{13} - \gamma + \theta \\ W_{24} \end{pmatrix} \quad (35)$$

$$m_{14}(Xi) = L_1(Xi) + S_4Xi) + (Xi, 1)\begin{pmatrix} U_{14} \\ W_{14} \end{pmatrix} \quad (36)$$

$$m_{21}(Xi) = L_2(Xi) + S_1(Xi) + (Xi, 1)\begin{pmatrix} U_{14} - \delta + \theta \\ W_{21} \end{pmatrix} \quad (37)$$

-continued $$m_5(Xi) + L_1(Xi) + L_2(Xi) + (Xi, 1)\begin{pmatrix} U_5 \\ W_5 \end{pmatrix} \quad (38)$$

Further, since the sum of internal angles 355 to 358 of the object to be measured 305 which is a polygon having n angles is 180×(n−2), the sum of internal angles of a right-angled square, for instance, is 360 degrees, so that the following equation is derived:

$$(90+\alpha)+(90+\beta)+(90+\gamma)+(90+\delta)=360 \Leftrightarrow \alpha+\beta+\gamma+\delta=0 \quad (39)$$

Herein the reference lines $R_1$ to $R_6$ are least self-square lines for the detected surfaces thereof, the following equations are derived. These equations arc derived by using the method of undetermined multiplier because the reference liens $R_1$ to $R_6$ are least self-square lines for the detected surfaces thereof.

$$\sum_i^n XiS_1(Xi) = \sum_i^n S_1(Xi) = 0 \quad (40)$$

$$\sum_i^n XiS_2(Xi) = \sum_i^n S_2(Xi) = 0 \quad (41)$$

$$\sum_i^n XiS_3(Xi) = \sum_i^n S_3(Xi) = 0 \quad (42)$$

$$\sum_i^n XiS_4(Xi) = \sum_i^n S_4(Xi) = 0 \quad (43)$$

$$\sum_i^n XiL_1(Xi) = \sum_i^n L_1(Xi) = 0 \quad (44)$$

$$\sum_i^n XiL_2(Xi) = \sum_i^n L_2(Xi) = 0 \quad (45)$$

The simultaneous equation deriving section 333 stores the equations (30) to (45) (according to this embodiment) therein, and derives simultaneous equations by applying the measurement data stored in the measurement data storage section 331 to the equations above.

The simultaneous equation processing section 334 processes the simultaneous equations (30) to (45) derived in the simultaneous equation deriving section 333 to obtain the form-function values ($L_1(x_i)$, $L_2(x_i)$, $S_1(x_i)$, $S_2(x_i)$, . . . ) shown in table m FIG. 19 and the angle-function values (α, β, γ, δ, θ) shown in the table in FIG. 20 (simultaneous equation processing step).

The function values computed as described above are outputted to the output section 304. The output section 304 is an external output device such as a monitor or a printer which can display or print out a result of the processing for computing.

Now description is made for a case in which a form of the object to be measured 305, which is a flat polygon, by using the form measuring device 301 having the configuration as described above.

In the measuring section 302, measurement data concerning the spaces m between the straightedge rules 321, 322 and edges 351 to 354 of the object to be measured 305 is obtained (measuring step). Two straightedge rules 321, 322 are placed so that extension lines thereof form a prespecified angle, and futher so that each of the straightedge rules 321, 322 is placed at a position substantially in parallel to an edge of the object to be measured 305. Assuming, for instance, that a right-angled square has a first edge 351, second edge 352, a third edge 353, and a fourth edge 354, the first edge 351 is placed at a position opposed to the first straightedge rule 321, and the second edge 352 is placed at a position opposed to the second straightedge rule 322. Parallelism between the straightedge rules 321, 322 and the edges 351, 352 is not required to be strictly accurate, and it is required only that the spaces between the straightedge rules 321, 322 and the edges 351, 352 are within the measurement rang for the length measuring sensor 324.

At first a moving pitch for the length measuring sensor 324 is set, and spaces between the straightedge rules 321, 322 and edges 351, 352 of the object to be measured 305 are measured with the length measuring sensor 324 each time the length measuring sensor 324 is moved by a moving pitch (space measuring step). In this step, spaces $m_{11}$ between the first straightedge rule 321 and the first edge 351 and spaces $m_{22}$ between the second straightedge rule 322 and the second edge 352 are measured at a prespecified sampling pitch.

For instance, when it is assumed that coordinates of sampling points are defined as $x_0, x_1, x_1, x_2, \ldots x_i, \ldots x_n$ successively from an edge of a Straightedge rule along the straightedge rules 321, 322 and measurement data for a space between the first straightedge rule 321 and the first edge 351 is expressed as $m_{11}$, the spaces between the first straightedge rule 321 and the first edge 351 are measured as $m_{11}(x_0), m_{11}(x_{11}), m_{11}(x_2), \ldots m_{11}(x_i), \ldots m_{11}(x_n)$ (Refer to, for instance, FIG. 18).

After the space $m_{11}(x_i)$ between the first straightedge rule 321 and the first edge 351 and the space $m_{22}(x_i)$ between the second straightedge rule 322 and the second edge 352 are measured, the object to be measured 305 is rotated without changing postures of the first straightedge rule 321 and the second straightedge rule 322 to change the pairs of the straightedge rules 321, 322 and edges 351 to 354 (pair changing step). It is assumed herein, for instance, that the second edge 352 faces against the first straightedge rule 321 and the third edge 353 faces against the second straightedge rule 322.

With the pairs as described above, the spaces $m_{12}, m_{23}$ between the straightedge rules 321, 322 and edges 352, 353 are measured to obtain measurement data Then by rotating the object to be measured 305 to change p of the straightedge rules 321, 322 and edges 351 to 354 of the object to be measured 305, distances between the straightedge rules 321, 322 and edges 351 to 354 of the object to be measured 305 are measured for all of the possible pairs with the length measuring sensor 324 (Refer to, for instance, FIG. 18).

Further the straightedge rude 321 and the second straightedge rule 322 are positioned substantially in parallel to each other with a space therebetween, and the space is measured with the length measuring sensor to obtain the measurement data $m_5(x_i)$ (straightedge rule space measuring step, refer to the bottom column in FIG. 17).

In all of the pairs of the straightedge rules 321, 322 and the edges 351 to 354, the sampling points for measuring spaces between the straightedge rules 321, 322 and the edges 351 to 354 are identical. Namely, when sampling points are defined as $x_0, x_1, x_2 \ldots x_i, \ldots x_n$ successively from an edge of a straightedge rule along the straightedge rules 321, 322, the sampling points are set in both the first straightedge rule 321 and the second straightedge rule 322 at the same pitch Therefore a point on the first edge 351 corresponding to the sampling point $x_i$ in measurement of the space $m_{11}$ between the first straightedge rule 321 and the first edge 351 is the same as the point on the first edge 351 corresponding to the sampling point $x_i$ in measurement of the space $m_{21}$ between the second straightedge rule 322 and the fist edge 351 even after the object to be measured 305 is rotated.

The measurement data obtained as described above is sent to the analyzing section 303 and is stored in the measurement data storage section 331 (Refer to FIG. 17 and FIG. 18).

The measurement data (FIG. 18) stored in the measurement data storage section 331 and the form-function and angle-function values (Refer to FIG. 19 and FIG. 20) set in the function-value setting section 332 are applied to the preset simultaneous equations (30) to (38) in the simultaneous equation deriving section 333 to derive the simultaneous equations (30) to (45). The simultaneous equations (30) to (45) are processed in the simultaneous equation processing section 334 to obtain the form-function values (S1, S2, . . . ) and the angle-function values ($\alpha, \beta \ldots$) for the object to be measured. By employing determinant calculation, the simultaneous equations can easily be processed.

Displacements of edges (351 to 354) of the object to be measured 305 from the detected surface at the sampling points are indicated by the form-function values $S_1(x_i)$, $S_2(x_i)$, $S_3(x_i)$, $S_4(x_i)$ . . . . For instance, straightness of the first edge is indicated by the difference between the maximum value and the minimum value, thus information concerning a form of the object to be measured being obtained.

Further angular displacements of the internal angles (355 to 358) of the object to be measured 305 from 180×(n−2)/n can be obtained from the angle-function values $\alpha, \beta, \gamma, \delta$ . . . . For instance, in the case where the object to be measured is a tight-angled square, the angular displacement of each internal angle from 90 degrees is obtained.

In addition, information concerning a form of a object to be measured including straightness of the straightedge rules 321, 322 can be obtained from the form-function values $L_1(x_i), L_2(x_i)$ for the straightedge rules 321, 322.

With the form measuring device 301 having the configuration as described above, the following remarkable advantages are provided.

(1) A form of the object to be measured 305 can be obtained by processing measurement data obtained by measuring distances from the straightedge rules 321, 322 each with the straightness still unknown to edges 351 to 354 of the object to be measured 305. Therefore the form of the object to be measured 305 can accurately and precisely be measured by processing measurement data regardless of precision of the straightedge rules 321, 322.

(2) Form-function values ($L_i, S_i$) at each sampling point can be computed, so that not only assessment of straightness can be made, but also irregularities on surface of each edge of the object to be measured 305 can be obtained.

(3) Internal angles of the object to be measured 305 can be computed as angle-function values ($\alpha, \beta \ldots$), so that, in addition to straightness of the edges (351 to 354) of the object to be measured 305, also internal angles (355 to 358) of the object to be measured 305 can be obtained.

(4) Even when distances between the straightedge rules 321, 322 and edges (351 to 354) of the object to be measured 305 are to be obtained, postures of the straightedge rules 321, 322 do not affect a result of processing, so that a precise measurement result can be obtained regardless of postures of the straightedge rules 321, 322. Further, as post of the straightedge miles 321, 322 and the object to be measured 305 not affect a result of measurement, there is no need for adjusting the postures, and a measurement work can efficiently be performed within a short period of time. For instance, it is not necessary to cross the straightedge rules 321, 322 strictly at 90 degrees, nor to align the straightedge rules 321, 322 with the edges 351 to 354 of the object to be measured 305 strictly in parallel to each other.

(5) The length me sensor 324 bas the spindles 326, 327 which moves back and forth in the opposite directions respectively, and the distances between the straightedge rules 321, 322 and the edges 351 to 354 of the object to be measured 305 are detected from a sum of forward and backward travels of the spindles 326, 327, so that the distances between the straightedge rules 321, 322 and the edges 351 to 354 of the object to be measured 305 cam accurately be measured. For instance, even when the moving shaft for moving the length measuring sensor 324 is displaced in the direction coupling the straightedge rules 321, 322 to the edges 351 to 354 of the object to be measured 305, the detected value accurately reflect the distances between the straightedge rules 321, 322 and the edges 351 to 354 of the object to be measured 305.

(6) When either one of the two straightedge rules 321, 322 and any of the edges 351 to 354 of The object to be measured 305 is combined and the distance therebetween can be measured, the measurement can be processed so that edge forms and internal angles of any object to be measured can be measured so long as the object to be measured is a flat polygonal body.

The form measuring device (form measuring method) according to the present invention is not limited to the embodiments described above, and it is needless to say that various changes and modification are possible within the range in which the objects of the present invention can be achieved.

The above descriptions assume a right-angled square as the flat polygonal object to be measured 305, but the present invention can be applied to various types of flat and polygonal object to be measured so long as the distances from the two straightedge rules 321, 322 can be measure& Namely when placed within a smaller angle formed by the two straightedge rules 321, 322, it is required that the spaces between the straightedge rules 321, 322 and edges (351 to 354) of the object to be measured 305 fall in the measurement range for the length measuring sensor 324. In this step, it is required that, when the object to be measured 305 is rotated without changing postures of the straightedge rules 321, 322, spaces between the straightedge rules 321, 322 and edges (351 to 354) of the object to be measured 305 fall in the measurement range of the length measuring sensor 324 in all of the pairs. Therefore, such an object to be measured as a concaved polygonal body having an internal angle larger than 180 degrees is not preferable as the object to be measured 305.

Further it is required for deriving simultaneous equations that the measurement data obtained by measuring spaces between the straightedge rules 321, 322 and the edges 351 to 354 of the object to be measured 305 in one pair is present in correspondence to the measurement data obtained by measuring spaces between the straightedge rules 321, 322 and the edges 351 to 354 of the object to be measured 305 in another pair, and therefore it is preferable that the edges (351 to 354) of the object to be measured 305 are within a range allowing presence of corresponding data in each pair.

There is no specific restriction over configuration of the length measuring sensor 324, and it is required only that a space can be measured. For instance, a bottom section of o the main body section 325 may be contacted to either one of the straightedge rules 321, 322 and the object to be measured 305 so that the tip is contacted thereto. Configuration of the length measuring sensor 324 is not limited to the contact system, and a scale sensor based on a non-contact system may be employed. For instance, the configuration is allowable in which there is provided an electrode which electrostatically couples to the object to be measured and a distance of the object to be measured is detected according to an electrostatic potential of this electrode.

The descriptions above assume the case in which the reference lines $R_1$ to $R_6$ are least self-square lines, but there is no specific restriction over the reference line, and any type of line may be set. For instance, a line connecting any given two points on a detected surface may be set as a reference line, Even in this case, by deciding conditions for two points through which the reference line passes, conditional equations equivalent to the equations (40) to (45) can be derived.

Although a plurality (for instance, three) sampling points arm required for measuring straightness of a object to be measured, for measuring only internal angles of a object to be measured, a plurality of sampling points are not always required, and only two sampling points are required only for each pair of either one of the straightedge rules 321, 322 and any of the edges 351 to 354 of the object to be measured 305.

In the second embodiment, as in the first embodiment, the form-function values also can be dictated by setting basis having elements linearly independent to each other. Accordingly, a basis function setting section 339 can be set to the analyzing section 303 as shown in FIG. 17.

The basis function setting section 339 can be made as an equivalent to the basis function setting section 33 of the first embodiment.

The object for which the basis to be set can be form-function values ($L_1, L_2, S_1, S_2, S_3, S_4, \ldots$), which indicates the forms of the each edge (351 to 354) of the object to be measured (305) and the straightedge rules (321,322). It is less necessary to set basis for the angle-function values ($\alpha, \beta \ldots$), which indicates internal angles (355 to 358) of the object to be measured (305), since the vertexes of the object to be measured (305) are apparently positioned as sampling points. Conversely, the sampling points on each edge can be made more effective by setting basis.

What is claimed is:

1. A form measuring device comprising:
   a measuring section for combining two out of three surfaces to be measured substantially in parallel to each other as a pair in a specific pattern, and respectively measuring a space therebetween at a plurality of sampling points;
   a function value setting section for setting form-function values, which indicates distances from reference planes respectively set for each of said surfaces to be measured to said surfaces to be measured;
   a simultaneous equation deriving section for deriving simultaneous equations for a pair of said surfaces to be measured having a specific pattern assuming that an surface spacing between said surfaces to be measured placed in said specific pattern is equal to the sum of a distance from said reference plane to said surface to be measured and a distance between said reference planes set for said surfaces to be measured paired with each other;
   a simultaneous equation processing section for processing the derived simultaneous equations; and
   an output section to which a processing result of the simultaneous equation processing section is output, wherein said measuring section measures surface spacing between said surface to be measured for five pairs including:
- three pairs formed by combining two out of said three surfaces to be measured substantially in parallel to each other;
- one pair formed by rotating a surface to be measured of one of said three pairs by a predetermined number of degrees against the other surface; and
- another pair formed by displacing a surface to be measured of one of said three pairs in parallel to the other surface.

2. The form measuring device according to claim 1 comprising a basis function setting section for setting a basis having elements linearly independent to each other,
wherein a distance from said reference plane to said surface to be measured is expressed with a linear coupling of said basis with a specified coupling factor.

3. A form measuring method comprising:
a measuring step of combining two out of three surfaces to be measured substantially in parallel to each other as a pair in a specific pattern and respectively measuring a space therebetween at a plurality of sampling points;
a function setting step of setting form-function values, which indicates distances from said reference planes respectively set for each of said surfaces to be measured to said surfaces to be measured;
a simultaneous equation deriving step of deriving simultaneous equations for a pair of said surfaces to be measured having a specific pattern assuming that an surface spacing between said surfaces to be measured placed in said specific pattern is equal to the sum of a distance from said reference plane to said surface to be measured and a distance between said reference planes set for said surfaces to be measured paired with each other;
a simultaneous equation processing step of processing the derived simultaneous equations; and
an output step for outputting a processing result of the simultaneous equation processing step,
wherein said measuring step measures surface spacing between said surface to be measured for five pairs including:
- three pairs formed by combining two out of said three surfaces to be measured substantially in parallel to each other;
- one pair formed by rotating a surface to be measured of one of said three pairs by a predetermined number of degrees against the other surface; and
- another pair formed by displacing a surface to be measured of one of said three pairs in parallel to the other surface.

4. The form measuring method according to claim 3, further comprising:
a basis function setting step for setting a basis having elements linearly independent to each other,
wherein a distance from said reference plane to said surface to be measured is expressed with a linear coupling of said basis with a specified coupling factor.

5. A form analyzing device for analyzing measurement data, which is obtained by combining two out of three surfaces to be measured substantially in parallel to each other as a pair in a specific pattern and respectively measuring a space therebetween at a plurality of sampling points, to analyze a form of said surface to be measured, said device comprising:
a function value setting section for setting form-function values, which indicates distances from reference planes respectively set for each of said surfaces to be measured to said surfaces to be measured at the plurality of sampling points;
a simultaneous equation deriving section for deriving simultaneous equations for a pair of said surfaces to be measured having a specific pattern assuming that an surface spacing between said surfaces to be measured placed in said specific pattern is equal to the sum of a distance from said reference plane to said surface to be measured and a distance between said reference planes set for said surfaces to be measured paired with each other;
a simultaneous equation processing section for processing the derived simultaneous equations; and
an output section to which a processing result of the simultaneous equation processing section is output,
wherein the pair of surfaces in the specific pattern includes five pairs including:
- three pairs formed by combining two out of said three surfaces to be measured substantially in parallel to each other;
- one pair formed by rotating a surface to be measured of one of said three pairs by a predetermined number of degrees against the other surface; and
- another pair formed by displacing a surface to be measured of one of said three pairs in parallel to the other surface.

6. The form analyzing device according to claim 5, further comprising:
a basis function setting section for setting a basis having elements linearly independent to each other,
wherein a distance from said reference plane to said surface to be measured is expressed with a linear coupling of said basis with a specified coupling factor.

7. A computer-readable form analysis program for a computer incorporated in a form analyzing device for analyzing measurement data, which is obtained by combining two out of three surfaces to be measured substantially in parallel to each other as a pair in a specific pattern and respectively measuring a space therebetween at a plurality of sampling points, to analyze a form of said surface to be measured, the computer functioning as:
a function value setting section for setting form-function values, which indicates distances from reference planes respectively set for each of said surfaces to be measured to said surfaces to be measured at the plurality of sampling points;
a simultaneous equation deriving section for deriving simultaneous equations for a pair of said surfaces to be measured having a specific pattern assuming that an surface spacing between said surfaces to be measured placed in said specific pattern is equal to the sum of a distance from said reference plane to said surface to be measured and a distance between said reference planes set on said surfaces to be measured paired with each other;
a simultaneous equation processing section for processing the derived simultaneous equations; and
an output section to which a processing result of the simultaneous equation processing section is output,
wherein the pair of surfaces in the specific pattern includes five pairs including:
- three pairs formed by combining two out of said three surfaces to be measured substantially in parallel to each other;

one pair formed by rotating a surface to be measured of one of said three pairs by a predetermined number of degrees against the other surface; and another pair formed by displacing a surface to be measured of one of said three pairs in parallel to the other surface.

8. A computer-readable recording medium with the form analysis program according to claim 7 recorded therein.

9. The program according to claim 7, further comprising:

a basis function setting section for setting a basis having elements linearly independent to each other, wherein a distance from said reference plane to said surface to be measured is expressed with a linear coupling of said basis with a specified coupling factor.

* * * * *